United States Patent
Wu et al.

(10) Patent No.: US 11,184,910 B2
(45) Date of Patent: Nov. 23, 2021

(54) CONTROL INFORMATION TRANSMISSION METHOD, TERMINAL DEVICE, NETWORK SIDE DEVICE, AND COMMUNICATIONS SYSTEM

(71) Applicant: HUAWEI TECHNOLOGIES CO., LTD., Guangdong (CN)

(72) Inventors: Yiqun Wu, Shanghai (CN); Yan Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 47 days.

(21) Appl. No.: 16/711,998

(22) Filed: Dec. 12, 2019

(65) Prior Publication Data

US 2020/0120703 A1 Apr. 16, 2020

Related U.S. Application Data

(63) Continuation of application No. PCT/CN2018/091185, filed on Jun. 14, 2018.

(30) Foreign Application Priority Data

Jun. 14, 2017 (CN) .......................... 201710448509.6

(51) Int. Cl.
*H04W 72/12* (2009.01)
*H04L 5/00* (2006.01)
*H04L 27/26* (2006.01)

(52) U.S. Cl.
CPC ....... *H04W 72/1278* (2013.01); *H04L 5/0055* (2013.01); *H04L 27/2601* (2013.01); *H04W 72/1231* (2013.01)

(58) Field of Classification Search
None
See application file for complete search history.

(56) References Cited

U.S. PATENT DOCUMENTS

2009/0196247 A1 8/2009 Fan et al.
2011/0274099 A1* 11/2011 Kwon .................... H04L 5/003
370/338

(Continued)

FOREIGN PATENT DOCUMENTS

CN 102006107 A 4/2011
CN 102158326 A 8/2011

(Continued)

OTHER PUBLICATIONS

3GPP TS 36.211 V14.2.0 (Mar. 2017),3rd Generation Partnership Project;Technical Specification Group Radio Access Network,Evolved Universal Terrestrial Radio Access (E-UTRA); Physical channels and modulation(Release 14), total 197 pages.

(Continued)

*Primary Examiner* — Hassan A Phillips
*Assistant Examiner* — Gautam Sharma
(74) *Attorney, Agent, or Firm* — Womble Bond Dickinson (US) LLP

(57) ABSTRACT

The present application describes a control information transmission method, a terminal device, a network side device, and a communications system. The method may be implemented by a terminal device and include determining, based on a preset mapping relationship between bit combinations and modulation symbols, a modulation symbol corresponding to a to-be-transmitted bit combination and a resource used to send the determined modulation symbol, where in the mapping relationship, each bit combination corresponds to one modulation symbol to be sent on a first resource or one modulation symbol to be sent on a second resource. In bit combinations corresponding to modulation symbols sent on at least one of the first resource and the second resource, SR bits in at least two bit combinations are different, and ACK/NACK bits in at least two bit combina- (Continued)

tions are different. Furthermore, the method may include sending, on the determined resource, the modulation symbol corresponding to the to-be-transmitted bit combination.

12 Claims, 9 Drawing Sheets

(56) References Cited

U.S. PATENT DOCUMENTS

| | | | | |
|---|---|---|---|---|
| 2012/0140728 | A1* | 6/2012 | Nakao | H04L 5/0023 |
| | | | | 370/329 |
| 2012/0294273 | A1* | 11/2012 | Ahn | H04W 72/0406 |
| | | | | 370/329 |
| 2013/0022019 | A1* | 1/2013 | Han | H04L 5/0069 |
| | | | | 370/329 |
| 2013/0235768 | A1 | 9/2013 | Earnshaw et al. | |
| 2017/0201329 | A1* | 7/2017 | Kan | H04L 1/0052 |
| 2018/0199335 | A1* | 7/2018 | Jung | H04L 1/1812 |
| 2019/0007171 | A1* | 1/2019 | Gao | H04L 1/1854 |
| 2019/0246416 | A1* | 8/2019 | Park | H04W 72/1278 |
| 2020/0008227 | A1* | 1/2020 | Lee | H04L 5/00 |
| 2020/0037349 | A1* | 1/2020 | Gao | H04L 5/001 |

FOREIGN PATENT DOCUMENTS

| | | |
|---|---|---|
| CN | 102215595 A | 10/2011 |
| CN | 102571297 A | 7/2012 |
| CN | 103427940 A | 12/2013 |
| EP | 2592776 A1 | 5/2013 |
| EP | 2797253 A1 | 10/2014 |

OTHER PUBLICATIONS

Nokia, Alcatel-Lucent Shanghai Bell, Multiplexing between SR and other UCI on short PUCCH. 3GPP TSG RAN WG1#89 Hangzhou, P.R. China, May 15-19, 2017, R1-1708511, 3 pages.

Liyingchun et al.,"An Analysis of the Basic Theory of Information",China Development Press,2016,with an English machine translation, total 6 pages.

* cited by examiner

CONTROL INFORMATION TRANSMISSION METHOD, TERMINAL DEVICE, NETWORK SIDE DEVICE, AND COMMUNICATIONS SYSTEM

CROSS-REFERENCE TO RELATED APPLICATIONS

This application is a continuation of International Application No. PCT/CN2018/091185, filed on Jun. 14, 2018, which claims priority to Chinese Patent Application No. 201710448509.6, filed on Jun. 14, 2017. The disclosures of the aforementioned applications are hereby incorporated by reference in their entireties.

TECHNICAL FIELD

The present application relates to the communications fields, and more specifically, to a control information transmission method, a terminal device, a network side device, and a communications system.

BACKGROUND

In a typical wireless communications network (for example, a Long Termin Evoluation (LTE) communication network), an physical uplink control channel (PUCCH) is used to transmit uplink control information (UCI) such as a scheduling request (SR) and an ACK/NACK. Generally, a time domain resource, a frequency domain resource, and a code domain resource of the SR are configured by using higher layer signaling sent by a base station, and a time domain resource, a frequency domain resource, and a code domain resource corresponding to the acknowledgment (ACK)/negative acknowledgment (NACK) are configured by using a physical downlink control channel (PDCCH) or an enhanced physical downlink control channel (EPDCCH). For the same user equipment (UE), the base station may allocate an SR resource and an ACK/NACK resource in a same subframe to the UE. If the UE sends an SR signal on the SR resource in the subframe and also sends an ACK/NACK signal on the ACK/NACK resource in the subframe, the SR signal is superimposed on the ACK/NACK signal. This increases a peak-to-average ratio and reduces transmission power efficiency.

SUMMARY

In view of this, this application provides a control information transmission method, a terminal device, a network side device, and a communications system, to reduce a peak-to-average ratio and improve transmission power efficiency.

According to a first aspect, a control information transmission method is provided. The method includes: determining, by a terminal device based on a preset mapping relationship between bit combinations and modulation symbols, a modulation symbol corresponding to a to-be-transmitted bit combination and a resource used to send the determined modulation symbol, where in the mapping relationship, the bit combination includes a scheduling request SR bit and an acknowledgment (ACK)/negative acknowledgment (NACK) bit; each bit combination corresponds to one modulation symbol needing to be sent on a first resource or corresponds to one modulation symbol needing to be sent on a second resource; and in bit combinations corresponding to modulation symbols sent on at least one of the first resource and the second resource, SR bits in at least two bit combinations are different, and ACK/NACK bits in at least two bit combinations are different; and sending, by the terminal device on the determined resource, the modulation symbol corresponding to the to-be-transmitted bit combination.

In the method provided in the first aspect, data is prevented from being simultaneously sent on two resources located in a same subframe. Therefore, a peak-to-average ratio is lower than that in the prior art, and transmission power efficiency and coverage performance are higher than those in the prior art.

According to the first aspect, in a first possible embodiment of the control information transmission method, in the mapping relationship, each bit combination corresponds to one first-type modulation symbol and one second-type modulation symbol, and a value that is of one modulation symbol in the first-type modulation symbol and the second-type modulation symbol and that corresponds to a value of the bit combination is 0, and a value that is of the other modulation symbol and that corresponds to the value of the bit combination is not 0; and the first-type modulation symbol needs to be sent on the first resource, and the second-type modulation symbol needs to be sent on the second resource; and correspondingly, the sending, by the terminal device on the determined resource, the modulation symbol corresponding to the to-be-transmitted bit combination includes: sending, by the terminal device on the first resource, a first-type modulation symbol that corresponds to the to-be-transmitted bit combination and whose value is not 0, or sending, by the terminal device on the second resource, a second-type modulation symbol that corresponds to the to-be-transmitted bit combination and whose value is not 0.

According to the first aspect, in a second possible embodiment of the control information transmission method, the mapping relationship is specifically a preset mapping relationship among bit combinations, modulation symbols, and resource identifiers; and in the mapping relationship, the resource identifier includes an identifier of the first resource and an identifier of the second resource, and each bit combination corresponds to one of the identifier of the first resource and the identifier of the second resource; and the sending, by the terminal device on the determined resource, the modulation symbol corresponding to the to-be-transmitted bit combination includes: sending, by the terminal device, the determined modulation symbol on a resource corresponding to a resource identifier corresponding to the to-be-transmitted bit combination.

According to a second aspect, a control information transmission method is provided. The method includes: when a first resource and a second resource that are configured by a network side device for a terminal device are located in a same subframe, receiving, on one of the first resource and the second resource, a modulation symbol sent by the terminal device; and determining, by the network side device based on the resource used to receive the modulation symbol and a preset mapping relationship between bit combinations and modulation symbols, a bit combination corresponding to the received modulation symbol, where in the mapping relationship, the bit combination includes a scheduling request SR bit and an acknowledgment ACK/negative acknowledgment NACK bit; each bit combination corresponds to one modulation symbol needing to be sent on the first resource or corresponds to one modulation symbol needing to be sent on the second resource; and in bit combinations corresponding to modulation symbols sent on at least one of the first resource and the second resource, SR bits in at least two bit combinations are different, and ACK/NACK bits in at least two bit combinations are different.

In the method provided in the second aspect, data is prevented from being simultaneously sent on two resources located in a same subframe. Therefore, a peak-to-average ratio is lower than that in the prior art, and transmission power efficiency and coverage performance are higher than those in the prior art.

According to the second aspect, in a first possible embodiment of the control information transmission method, in the mapping relationship, each bit combination corresponds to one first-type modulation symbol and one second-type modulation symbol, and a value that is of one modulation symbol in the first-type modulation symbol and the second-type modulation symbol and that corresponds to a value of the bit combination is 0, and a value that is of the other modulation symbol and that corresponds to the value of the bit combination is not 0; and the first-type modulation symbol needs to be sent on the first resource, and the second-type modulation symbol needs to be sent on the second resource; and correspondingly, the receiving, on one of the first resource and the second resource, a modulation symbol sent by the terminal device includes: receiving, on the first resource, a first-type modulation symbol whose value is not 0 and that is sent by the terminal device, or receiving, on the second resource, a second-type modulation symbol whose value is not 0 and that is sent by the terminal device.

According to the second aspect, in a second possible embodiment of the control information transmission method, the mapping relationship is specifically a preset mapping relationship among bit combinations, modulation symbols, and resource identifiers; in the mapping relationship, the resource identifier includes an identifier of the first resource and an identifier of the second resource, and each bit combination corresponds to one of the identifier of the first resource and the identifier of the second resource; and the determining, by the network side device based on the resource used to receive the modulation symbol and a preset mapping relationship between bit combinations and modulation symbols, a bit combination corresponding to the received modulation symbol includes: determining, by the network side device based on the mapping relationship among bit combinations, modulation symbols, and resource identifiers, the bit combination corresponding to the received modulation symbol and a resource identifier of the resource used to receive the modulation symbol.

According to the first possible embodiment of the first aspect or the first possible embodiment of the second aspect, in another possible embodiment, in the mapping relationship, a quantity of first-type modulation symbols whose values are not 0 is equal to a quantity of second-type modulation symbols whose values are not 0. In this embodiment, distribution of modulation symbols is optimized, a bit error rate is reduced, transmission efficiency is improved, a low peak-to-average ratio of a transmitted signal is ensured, and uplink signal transmission reliability is improved.

According to the first possible embodiment of the first aspect, the first possible embodiment of the second aspect, or the foregoing another possible embodiment, in another possible embodiment, in the mapping relationship, the SR bit has M values, and the ACK/NACK bit has N values; there are M bit combinations corresponding to the first-type modulation symbol whose value is not 0, and values of SR bits in any two of the M bit combinations are different; and there are N bit combinations corresponding to the first-type modulation symbol whose value is not 0, and values of ACK/NACK bits in any two of the N bit combinations are different; and there are M bit combinations corresponding to the second-type modulation symbol whose value is not 0, and values of SR bits in any two of the M bit combinations are different; and there are N bit combinations corresponding to the second-type modulation symbol whose value is not 0, and values of ACK/NACK bits in any two of the N bit combinations are different. In this embodiment, distribution of modulation symbols is further optimized, a bit error rate is reduced, transmission efficiency is improved, a low peak-to-average ratio of a transmitted signal is further ensured, and uplink signal transmission reliability is improved.

According to the first possible embodiment of the first aspect, the first possible embodiment of the second aspect, or the foregoing another possible embodiment, in another possible embodiment, in the mapping relationship, in bit combinations corresponding to each value of the SR bits, half of the bit combinations correspond to the first-type modulation symbol whose value is not 0, and the other half of the bit combinations correspond to the second-type modulation symbol whose value is not 0; and in bit combinations corresponding to each value of the ACK/NACK bits, half of the bit combinations correspond to the first-type modulation symbol whose value is not 0, and the other half of the bit combinations correspond to the second-type modulation symbol whose value is not 0. In this embodiment, distribution of modulation symbols is further optimized, a bit error rate is reduced, transmission efficiency is improved, a low peak-to-average ratio of a transmitted signal is further ensured, and uplink signal transmission reliability is improved.

According to the second possible embodiment of the first aspect or the second possible embodiment of the second aspect, in another possible embodiment, in the mapping relationship, a quantity of modulation symbols corresponding to the identifier of the first resource is equal to a quantity of modulation symbols corresponding to the identifier of the second resource. In this embodiment, distribution of modulation symbols is further optimized, a bit error rate is reduced, transmission efficiency is improved, a low peak-to-average ratio of a transmitted signal is further ensured, and uplink signal transmission reliability is improved.

According to the second possible embodiment of the first aspect, the second possible embodiment of the second aspect, or the foregoing another possible embodiment, in another possible embodiment, in the mapping relationship, the SR bit has M values, and the ACK/NACK bit has N values; there are M bit combinations corresponding to the identifier of the first resource, and values of SR bits in any two of the M bit combinations are different; and there are N bit combinations corresponding to the identifier of the first resource, and values of ACK/NACK bits in any two of the N bit combinations are different; and there are M bit combinations corresponding to the identifier of the second resource, and values of SR bits in any two of the M bit combinations are different; and there are N bit combinations corresponding to the identifier of the second resource, and values of ACK/NACK bits in any two of the N bit combinations are different. In this embodiment, distribution of modulation symbols is further optimized, a bit error rate is reduced, transmission efficiency is improved, a low peak-to-average ratio of a transmitted signal is further ensured, and uplink signal transmission reliability is improved.

According to the second possible embodiment of the first aspect, the second possible embodiment of the second aspect, or the foregoing another possible embodiment, in another possible embodiment, in the mapping relationship, in bit combinations corresponding to each value of the SR bits, half of the bit combinations correspond to the identifier of the first resource, and the other half of the bit combinations correspond to the identifier of the second resource; and in bit combinations corresponding to each value of the ACK/NACK bits, half of the bit combinations correspond to the identifier of the first resource, and the other half of the bit combinations correspond to the identifier of the second resource. In this embodiment, distribution of modulation symbols is further optimized, a bit error rate is reduced, transmission efficiency is improved, a low peak-to-average ratio of a transmitted signal is further ensured, and uplink signal transmission reliability is improved.

According to a third aspect, a control information transmission method is provided. The method includes: determining, by a terminal device based on a preset mapping relationship between bit combinations and sequences, a sequence corresponding to a to-be-transmitted bit combination, where in the mapping relationship, the bit combination includes a scheduling request SR bit and an acknowledgment ACK/negative acknowledgment NACK bit, and each bit combination corresponds to one sequence; and sending, by the terminal device, the determined sequence.

In the method provided in the third aspect, data is prevented from being simultaneously sent on two resources located in a same subframe. Therefore, a peak-to-average ratio is lower than that in the prior art, and transmission power efficiency and coverage performance are higher than those in the prior art.

According to the third aspect, in a first possible embodiment of the control information transmission method, the method further includes: receiving, by the terminal device, first sequence information configured by a network side device for the terminal device, where the first sequence information is used to indicate a sequence that should be used to feed back an SR; receiving, by the terminal device, second sequence information configured by the network side device for the terminal device, where the second sequence information is used to indicate a sequence that should be used to feed back ACK/NACK; and when a sum of a quantity of sequences indicated by the first sequence information and a quantity of sequences indicated by the second sequence information is equal to a quantity of values of the bit combination, determining, by the terminal device, the mapping relationship based on the sequences indicated by the first sequence information and the sequences indicated by the second sequence information.

According to the third aspect, in a second possible embodiment of the control information transmission method, the method further includes: receiving, by a terminal device, first sequence information configured by the network side device for the terminal device, where the first sequence information is used to indicate a sequence that should be used to feed back an SR; receiving, by the terminal device, second sequence information configured by the network side device for the terminal device, where the second sequence information is used to indicate a sequence that should be used to feed back ACK/NACK, where a sum of a quantity of sequences indicated by the first sequence information and a quantity of sequences indicated by the second sequence information is less than a quantity of values of the bit combination; further receiving, by the terminal device, third sequence information configured by the network side device for the terminal device, where a sum of a quantity of sequences indicated by the third sequence information, the quantity of sequences indicated by the first sequence information, and the quantity of sequences indicated by the second sequence information is equal to the quantity of values of the bit combination; and determining, by the terminal device, the mapping relationship based on the sequences indicated by the first sequence information, the sequences indicated by the second sequence information, and the sequences indicated by the third sequence information.

According to the third aspect, in a third possible embodiment of the control information transmission method, the method further includes: receiving, by a terminal device, first sequence information configured by the network side device for the terminal device, where the first sequence information is used to indicate a sequence that should be used to feed back an SR; receiving, by the terminal device, second sequence information configured by the network side device for the terminal device, where the second sequence information is used to indicate a sequence that should be used to feed back ACK/NACK, where a sum of a quantity of sequences indicated by the first sequence information and a quantity of sequences indicated by the second sequence information is less than a quantity of values of the bit combination; and determining, by the terminal device, the mapping relationship based on the sequences indicated by the first sequence information, the sequences indicated by the second sequence information, and D preset sequences, where the sum of the quantity of sequences indicated by the first sequence information and the quantity of sequences indicated by the second sequence information is S, and a difference between S and the quantity of values of the bit combination is D.

According to a fourth aspect, a control information transmission method is provided. The method includes: receiving, by a network side device, a sequence sent by a terminal device; and determining, by the network side device based on a preset mapping relationship between bit combinations and sequences, a bit combination corresponding to the received sequence, where in the mapping relationship, the bit combination includes a scheduling request SR bit and an acknowledgment ACK/negative acknowledgment NACK bit, and each bit combination corresponds to one sequence.

In the method provided in the fourth aspect, data is prevented from being simultaneously sent on two resources located in a same subframe. Therefore, a peak-to-average ratio is lower than that in the prior art, and transmission power efficiency and coverage performance are higher than those in the prior art.

According to the fourth aspect, in a first possible embodiment of the control information transmission method, the method further includes: sending, by the network side device, first sequence information to the terminal device, where the first sequence information is used to indicate a sequence that should be used to feed back an SR; and sending, by the network side device, second sequence information to the terminal device, where the second sequence information is used to indicate a sequence that should be used to feed back ACK/NACK.

According to the fourth aspect, in a second possible embodiment of the control information transmission method, the method further includes: sending, by the network side device, first sequence information to the terminal device, where the first sequence information is used to indicate a sequence that should be used to feed back an SR; sending, by the network side device, second sequence information to the terminal device, where the second sequence information is used to indicate a sequence that should be used to feed back ACK/NACK, where a sum of a quantity of sequences indicated by the first sequence information and a quantity of sequences indicated by the second sequence information is less than a quantity of values of the bit combination; and further sending, by the network side device, third sequence information to the terminal device, where a sum of a quantity of sequences indicated by the third sequence information, the quantity of sequences indicated by the first sequence information, and the quantity of sequences indicated by the second sequence information is equal to the quantity of values of the bit combination.

According to a fifth aspect, a terminal device is provided. The terminal device includes a processor and a transceiver; the processor is configured to determine, based on a preset mapping relationship between bit combinations and modulation symbols, a modulation symbol corresponding to a to-be-transmitted bit combination and a resource used to send the determined modulation symbol, where in the mapping relationship, the bit combination includes a scheduling request SR bit and an acknowledgment ACK/negative acknowledgment NACK bit; each bit combination corresponds to one modulation symbol needing to be sent on a first resource or corresponds to one modulation symbol needing to be sent on a second resource; and in bit combinations corresponding to modulation symbols sent on at least one of the first resource and the second resource, SR bits in at least two bit combinations are different, and ACK/NACK bits in at least two bit combinations are different; and the transceiver is configured to send, on the determined resource, the modulation symbol corresponding to the to-be-transmitted bit combination.

In the terminal device provided in the fifth aspect, data is prevented from being simultaneously sent on two resources located in a same subframe. Therefore, a peak-to-average ratio is lower than that in the prior art, and transmission power efficiency and coverage performance are higher than those in the prior art.

According to a sixth aspect, a network side device is provided. The network side device includes a processor and a transceiver; when a first resource and a second resource that are configured by the processor for a terminal device are located in a same subframe, the transceiver is configured to receive, on one of the first resource and the second resource, a modulation symbol sent by the terminal device; and the processor is configured to determine, based on the resource used to receive the modulation symbol and a preset mapping relationship between bit combinations and modulation symbols, a bit combination corresponding to the received modulation symbol, where in the mapping relationship, the bit combination includes a scheduling request SR bit and an acknowledgment ACK/negative acknowledgment NACK bit; each bit combination corresponds to one modulation symbol needing to be sent on the first resource or corresponds to one modulation symbol needing to be sent on the second resource; and in bit combinations corresponding to modulation symbols sent on at least one of the first resource and the second resource, SR bits in at least two bit combinations are different, and ACK/NACK bits in at least two bit combinations are different.

In the network side device provided in the sixth aspect, data is prevented from being simultaneously sent on two resources located in a same subframe. Therefore, a peak-to-average ratio is lower than that in the prior art, and transmission power efficiency and coverage performance are higher than those in the prior art.

According to a seventh aspect, a terminal device is provided. The terminal device includes a processor and a transceiver; the processor is configured to determine, based on a preset mapping relationship between bit combinations and sequences, a sequence corresponding to a to-be-transmitted bit combination, where in the mapping relationship, the bit combination includes a scheduling request SR bit and an acknowledgment ACK/negative acknowledgment NACK bit, and each bit combination corresponds to one sequence; and the transceiver is configured to send the determined sequence.

In the terminal device provided in the seventh aspect, data is prevented from being simultaneously sent on two resources located in a same subframe. Therefore, a peak-to-average ratio is lower than that in the prior art, and transmission power efficiency and coverage performance are higher than those in the prior art.

According to an eighth aspect, a network side device is provided. The network side device includes a processor and a transceiver; the transceiver is configured to receive a sequence sent by a terminal device; and the processor is configured to determine, based on a preset mapping relationship between bit combinations and sequences, a bit combination corresponding to the received sequence, where in the mapping relationship, the bit combination includes a scheduling request SR bit and an acknowledgment ACK/negative acknowledgment NACK bit, and each bit combination corresponds to one sequence.

In the network side device provided in the eighth aspect, data is prevented from being simultaneously sent on two resources located in a same subframe. Therefore, a peak-to-average ratio is lower than that in the prior art, and transmission power efficiency and coverage performance are higher than those in the prior art.

According to another aspect of this application, a chip is provided. The chip is configured to determine, based on a preset mapping relationship between bit combinations and modulation symbols, a modulation symbol corresponding to a to-be-transmitted bit combination and a resource used to send the determined modulation symbol, where in the mapping relationship, the bit combination includes a scheduling request SR bit and an acknowledgment ACK/negative acknowledgment NACK bit; each bit combination corresponds to one modulation symbol needing to be sent on a first resource or corresponds to one modulation symbol needing to be sent on a second resource; and in bit combinations corresponding to modulation symbols sent on at least one of the first resource and the second resource, SR bits in at least two bit combinations are different, and ACK/NACK bits in at least two bit combinations are different; and the chip is further configured to send, on the determined resource, the modulation symbol corresponding to the to-be-transmitted bit combination.

According to another aspect of this application, a chip is provided. The chip is configured to: when a first resource and a second resource that are configured for a terminal device are located in a same subframe, receive, on one of the first resource and the second resource, a modulation symbol sent by the terminal device; and the chip is configured to determine, based on the resource used to receive the modulation symbol and a preset mapping relationship between bit combinations and modulation symbols, a bit combination corresponding to the received modulation symbol, where in the mapping relationship, the bit combination includes a scheduling request SR bit and an acknowledgment ACK/negative acknowledgment NACK bit; each bit combination corresponds to one modulation symbol needing to be sent on the first resource or corresponds to one modulation symbol needing to be sent on the second resource; and in bit combinations corresponding to modulation symbols sent on at least one of the first resource and the second resource, SR bits in at least two bit combinations are different, and ACK/NACK bits in at least two bit combinations are different.

According to another aspect of this application, a chip is provided. The chip is configured to determine, based on a preset mapping relationship between bit combinations and sequences, a sequence corresponding to a to-be-transmitted bit combination, where in the mapping relationship, the bit combination includes a scheduling request SR bit and an acknowledgment ACK/negative acknowledgment NACK bit, and each bit combination corresponds to one sequence; and the chip is further configured to send the determined sequence.

According to another aspect of this application, a chip is provided. The chip is configured to receive a sequence sent by a terminal device; and the chip is further configured to determine, based on a preset mapping relationship between bit combinations and sequences, a bit combination corresponding to the received sequence, where in the mapping relationship, the bit combination includes a scheduling request SR bit and an acknowledgment ACK/negative acknowledgment NACK bit, and each bit combination corresponds to one sequence.

According to another aspect of this application, a communications system is provided. The system includes the terminal device described in the fifth aspect and the network side device described in the sixth aspect.

According to another aspect of this application, a communications system is provided. The system includes the terminal device described in the seventh aspect and the network side device described in the eighth aspect.

According to another aspect of this application, a computer-readable storage medium is provided. The computer-readable storage medium stores a computer software instruction used by the terminal device described in the fifth aspect, and when the computer software instruction is run on a computer, the computer is enabled to perform the methods according to the foregoing aspects.

According to another aspect of this application, a computer-readable storage medium is provided. The computer-readable storage medium stores a computer software instruction used by the network side device described in the sixth aspect, and when the computer software instruction is run on a computer, the computer is enabled to perform the methods according to the foregoing aspects.

According to another aspect of this application, a computer-readable storage medium is provided. The computer-readable storage medium stores a computer software instruction used by the terminal device described in the seventh aspect, and when the computer software instruction is run on a computer, the computer is enabled to perform the methods according to the foregoing aspects.

According to another aspect of this application, a computer-readable storage medium is provided. The computer-readable storage medium stores a computer software instruction used by the network side device described in the eighth aspect, and when the computer software instruction is run on a computer, the computer is enabled to perform the methods according to the foregoing aspects.

DESCRIPTION OF EMBODIMENTS

The following describes technical solutions in embodiments of the present invention with reference to the accompanying drawings in the embodiments of the present invention.

Figure 1:
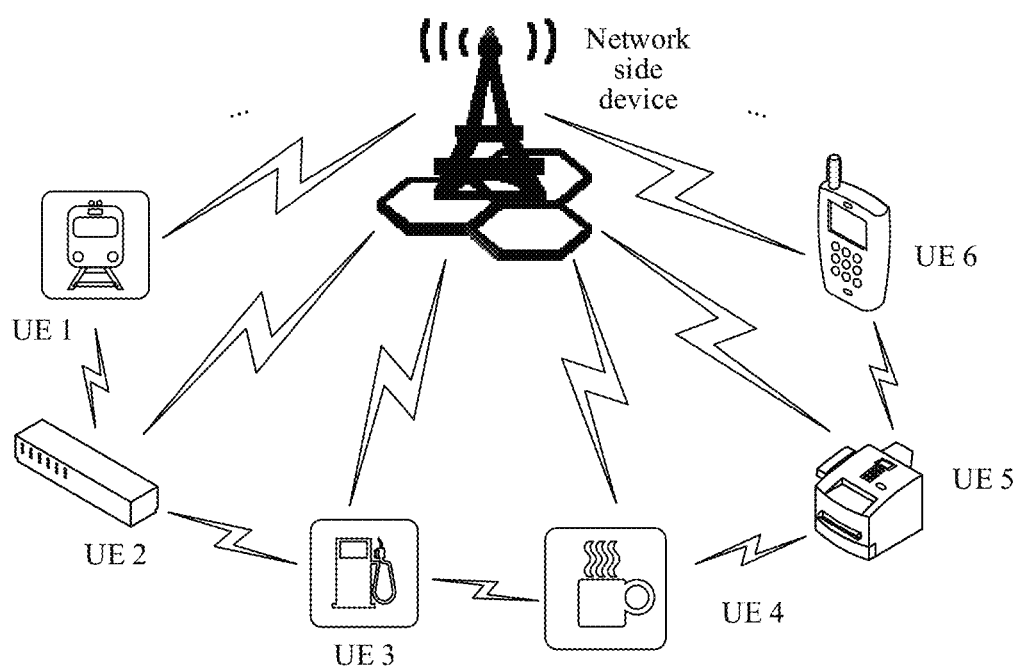
FIG. 1 is an example schematic diagram of a communications system according to an embodiment of the present invention.

The technical solutions in the embodiments of the present invention described in the following may be applicable to a communications system. The communications system may include one or more network side devices, and one or more user equipments (UE) that communicate with each network side device. FIG. 1 is an example of the communications system. The communications system shown in FIG. 1 includes one network side device and a plurality of user equipments (UE 1 to UE 6 shown in FIG. 1) communicating with the network side device.

The technical solutions in the embodiments of the present invention described in the following may be communication between a network side device and user equipment.

The network side device may be a device that can communicate with user equipment. The network side device may be, for example, a base station (a macro base station, a small cell/micro base station, a home eNodeB, or the like), a relay station, or an access point. The base station may be, for example, a base transceiver station (BTS) in a global system for mobile communications (GSM) or a code division multiple access (CDMA) network, or may be an NB (NodeB) in wideband code division multiple access (WCDMA), or may be an eNB or an eNodeB (e.g., an Evolved NodeB) in long term evolution (LTE), or may be a gNB in a fifth generation (5G) network or new radio (new radio, NR). The network side device may alternatively be, for example, a transmission reception point (TRPx) in a network. The network side device may alternatively be, for example, a radio controller in a cloud radio access network (CRAN) scenario. The network side device may alternatively be, for example, an access point (AP) in Wi-Fi. The network side device may alternatively be, for example, a wearable device or a vehicle-mounted device.

The user equipment may be, for example, an access terminal, a subscriber unit, a subscriber station, a mobile station, a remote station, a remote terminal, a mobile device, a user terminal, a terminal, a wireless communications device, a user agent, or a user apparatus. The access terminal may be, for example, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, user equipment in a 5G network, or user equipment in an evolved PLMN.

An example in which the network side device is a base station is used for description. A transmission resource (for example, a time-frequency resource or a code domain resource) that should be used when UE sends a scheduling request (SR) signal to the base station is configured by using higher layer signaling sent by the base station. In the following, a resource that is configured by the base station for the UE and that is used to send an SR is referred to as an SR resource. After the base station sends data to the UE, the UE feeds back an acknowledgment ACK/negative acknowledgment NACK signal to the base station, to inform the base station whether retransmission needs to be performed. A transmission resource (for example, a time-frequency resource or a code domain resource) that should be used when the UE sends ACK/NACK to the base station is configured by the base station by using a physical downlink control channel (PDCCH) or enhanced physical downlink control channel (EPDCCH). In the following, a resource that is configured by the base station for the UE and that is used to send ACK/NACK is referred to as an ACK/NACK resource. For the same user equipment (UE), an SR resource and an ACK/NACK resource that are configured by the base station for the UE may be located in a same subframe. If the UE sends an SR signal on the SR resource in the subframe and also sends an ACK/NACK signal on the ACK/NACK resource in the subframe, the SR signal is superimposed on the ACK/NACK signal. This increases a peak-to-average ratio and reduces transmission power efficiency and coverage performance.

In view of this situation, the embodiments of the present invention provide the following technical solutions: A mapping relationship between bit combinations and modulation symbols is preset both in the UE and the base station, where in the mapping relationship, the bit combination includes a scheduling request SR bit and an acknowledgment ACK/negative acknowledgment NACK bit; each bit combination corresponds to one modulation symbol needing to be sent on an SR resource or corresponds to one modulation symbol needing to be sent on an ACK/NACK resource; and in bit combinations corresponding to modulation symbols sent on at least one of the SR resource and the ACK/NACK resource, SR bits in at least two bit combinations are different, and ACK/NACK bits in at least two bit combinations are different. The base station configures the SR resource and the ACK/NACK resource for the UE. When the two types of resources configured by the base station are located in a same subframe, the UE first determines a to-be-transmitted bit combination based on a to-be-sent SR bit and a to-be-sent ACK/NACK bit, and then may determine, based on the mapping relationship, a modulation symbol corresponding to the to-be-transmitted bit combination and a resource that should be used to send the determined modulation symbol. Then, the UE sends the modulation symbol on the determined resource. The base station performs detection on the two resources, and may receive, on one of the resources (to be specific, the resource determined by the UE), the modulation symbol sent by the UE. Then, the base station may determine, based on the mapping relationship, the bit combination corresponding to the received modulation symbol, and further determine the SR bit and the ACK/NACK bit. According to the technical solutions provided in the embodiments of the present invention, although the base station allocates two resources in a same subframe to the UE, the UE sends the modulation symbol on only one of the resources, and the base station may determine the SR bit and the ACK/NACK bit based on the received modulation symbol and the resource used to send the modulation symbol. Data is prevented from being simultaneously sent on the two resources located in the same subframe. Therefore, a peak-to-average ratio is lower than that in prior approaches, and transmission power efficiency and coverage performance are higher than those in prior approaches.

The following describes the embodiments of the present invention in detail. In the following embodiments, an example in which a network side device is a base station is used for description. This is merely an example, and does not constitute a limitation on the network side device.

Figure 2:
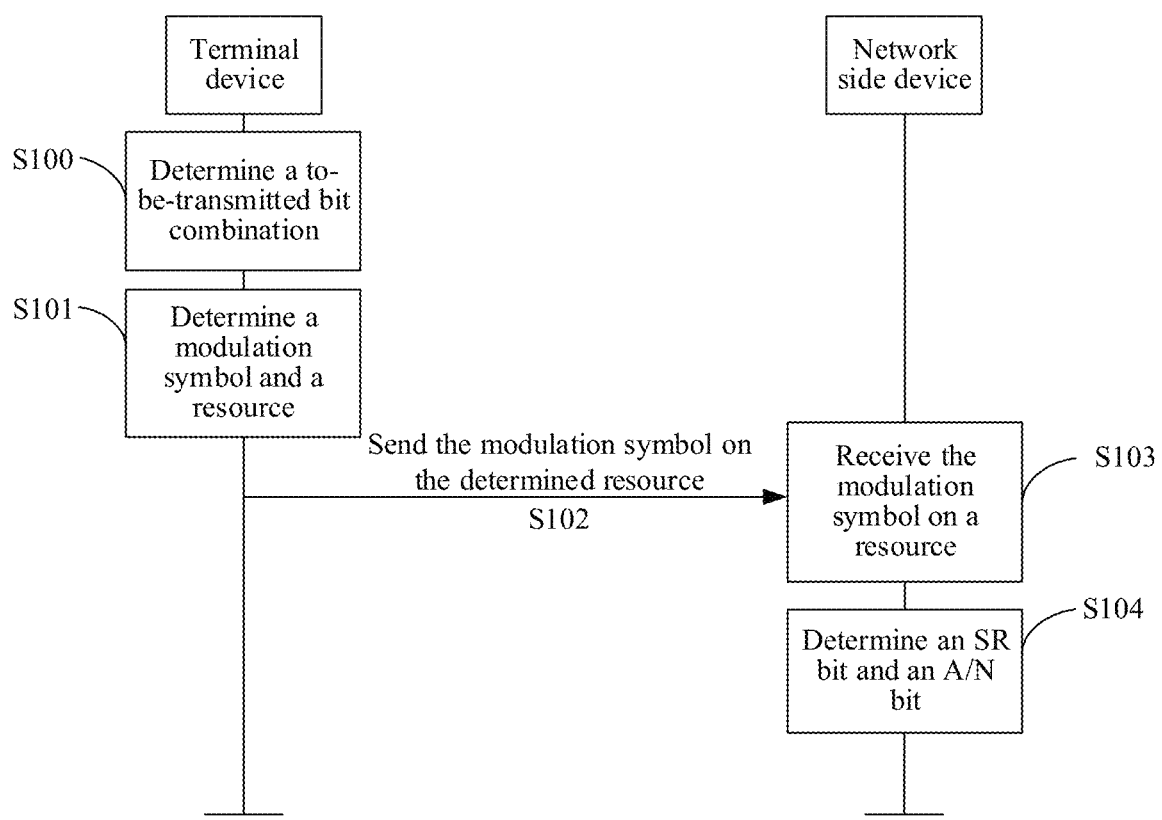
FIG. 2 is an example flowchart of a control information transmission method according to an embodiment of the present invention.

An embodiment of the present invention provides a control information transmission method. In the method, UE sends uplink control information (UCI) to a base station by using a modulation symbol. As shown in FIG. 2, the method includes the following steps.

S100: The UE determines a to-be-transmitted bit combination including a scheduling request SR bit and an ACK/NACK bit.

In this embodiment, the UE may receive first resource configuration information and second resource configuration information that are sent by the base station, determine a first resource based on the first resource configuration information, and determine a second resource based on the second resource configuration information. In the following descriptions, an example in which the first resource configuration information is SR resource configuration information, the first resource is an SR resource, the second resource configuration information is ACK/NACK resource configuration information, and the second resource is an ACK/NACK resource is used for description. It may be understood that this is merely an example. In another embodiment, the first resource and the second resource may alternatively be resources for sending other information, and are also applicable to a concept of the present invention.

When the UE determines that an SR resource and an ACK/NACK resource that are configured by the base station for the UE are located in a same subframe, the UE performs step S100.

The UE determines the SR bit based on whether the UE needs to send an SR to the base station. In an embodiment, the SR bit may be one bit. For example, when the UE needs to send the SR to the base station, the SR bit may be 1. When the UE does not need to send the SR to the base station, the SR bit may be 0.

Alternatively, in another embodiment, the SR bit may be at least two bits, and is used to indicate a service priority, buffer status information, and the like. For example, the SR is two bits. In this case, the SR bit may have four values: 00, 01, 10, and 11. When the UE does not need to send the SR to the base station, the SR bit may be 00. The SR bits 01, 10, and 11 each may be used to indicate the service priority, the buffer status information, and the like. For example, when the SR bit is 11, the SR bit may indicate a highest priority; when the SR bit is 01, the SR bit may indicate a lowest priority; and when the SR bit is 10, the SR bit may indicate a medium priority.

In an embodiment, the ACK/NACK bit may be one bit. For example, when the base station is required to perform retransmission, the ACK/NACK bit may be 1. When the base station is not required to perform retransmission, the ACK/NACK bit may be 0.

Alternatively, in another embodiment, the ACK/NACK bit may be at least two bits. For example, when the ACK/NACK bit is two bits, the ACK/NACK bit may be 00, 01, 10, or 11.

In an embodiment, when the SR has two states, for example, includes two states of "feeding back the SR" and "not feeding back the SR", the two states may be respectively referred to as a positive SR state and a negative SR state. A bit corresponding to the positive SR state may be, for example, 1, and a bit corresponding to the negative SR state may be, for example, 0. The bit combination may alternatively be referred to as a bit combination including a bit corresponding to an SR state and the ACK/NACK bit.

The UE and the base station may agree on a combination rule of a bit combination in advance.

In an embodiment, the bit combination may be in a form of SR+ACK/NACK. For example, if the SR bit is 0 and the ACK/NACK bit is 10, the UE may determine that the to-be-transmitted bit combination is 010.

Alternatively, in another embodiment, the bit combination may be in a form of ACK/NACK+SR. For example, if the SR bit is 11 and the ACK/NACK bit is 0, the UE may determine that the to-be-transmitted bit combination is 011.

S101: The UE determines, based on a preset mapping relationship between bit combinations and modulation symbols, a modulation symbol corresponding to the to-be-transmitted bit combination and a resource used to send the determined modulation symbol.

S102: The UE sends, on the determined resource, the modulation symbol corresponding to the to-be-transmitted bit combination.

In the mapping relationship, the bit combination includes a scheduling request SR bit and an acknowledgment ACK/negative acknowledgment NACK bit; and each bit combination corresponds to one modulation symbol needing to be sent on an SR resource or corresponds to one modulation symbol needing to be sent on an ACK/NACK resource.

In bit combinations corresponding to modulation symbols sent on at least one of the SR resource and the ACK/NACK resource, SR bits in at least two bit combinations are different, and ACK/NACK bits in at least two bit combinations are different. Specifically, the following three specific embodiments may be included:

Embodiment 1

In bit combinations corresponding to modulation symbols sent on the SR resource, SR bits in at least two bit combinations are different, and ACK/NACK bits in at least two bit combinations are different.

Embodiment 2

In bit combinations corresponding to modulation symbols sent on the ACK/NACK resource, SR bits in at least two bit combinations are different, and ACK/NACK bits in at least two bit combinations are different.

Embodiment 3

In bit combinations corresponding to modulation symbols sent on the SR resource, SR bits in at least two bit combinations are different, and ACK/NACK bits in at least two bit combinations are different; and in bit combinations corresponding to modulation symbols sent on the ACK/NACK resource, SR bits in at least two bit combinations are different, and ACK/NACK bits in at least two bit combinations are different.

In an embodiment, the mapping relationship mentioned in the foregoing embodiment may be stored, for example, in a form of a table, or may be stored in another form.

The mapping relationship may indicate a to-be-sent modulation symbol corresponding to each bit combination and a resource needing to be used to send the modulation symbol. The following are two specific embodiments of the mapping relationship:

Form 1: In an embodiment, the mapping relationship may be specifically a preset mapping relationship among bit combinations, modulation symbols, and resource identifiers. In the mapping relationship, the resource identifier includes an identifier of the SR resource and an identifier of the ACK/NACK resource, and each bit combination corresponds to one of the identifier of the SR resource and the identifier of the ACK/NACK resource. Therefore, each bit combination corresponds to one modulation symbol needing to be sent on the SR resource or corresponds to one modulation symbol needing to be sent on the ACK/NACK resource. The UE may determine, based on the mapping relationship, the modulation symbol and a resource identifier that correspond to the to-be-transmitted bit combination. A resource corresponding to the determined resource identifier is the resource used to send the determined modulation symbol. Step S102 specifically includes: The UE sends the determined modulation symbol on the resource corresponding to the resource identifier corresponding to the to-be-transmitted bit combination.

Figure 3:
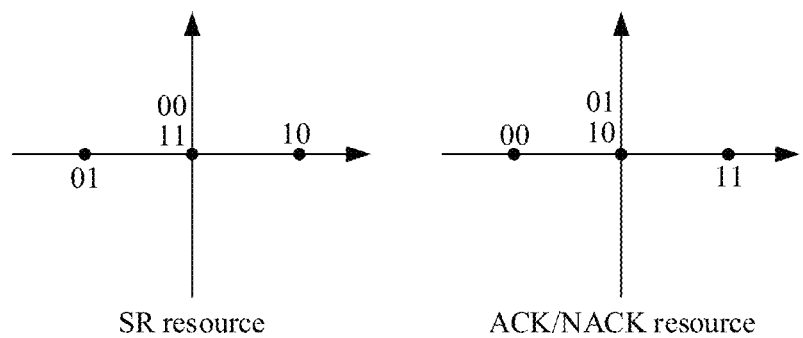
FIG. 3 is a schematic diagram of modulation symbol mapping according to an embodiment of the present invention.

As shown in Table 1 (below), it is assumed that an SR resource identifier is 1, and an ACK/NACK resource identifier is 0. It is assumed that the combination rule of the bit combination is SR+ACK/NACK, the SR bit $b_{SR}$ is one bit, and the ACK/NACK bit $b_{A/N}$ is also one bit. In ($b_{SR}^1$, $b_{A/N}^2$) in Table 1, a superscript indicates a position at which a bit is located in the bit combination, and a subscript indicates whether the bit is an SR bit or an ACK/NACK bit. For example, the bit combination is 01. $b_{SR}^1$ indicates that the first bit in the bit combination is "0" and is the SR bit; and $b_{A/N}^2$ indicates that the second bit in the bit combination is "1" and is the ACK/NACK bit. A resource identifier corresponding to the bit combination 01 is 1, and a modulation symbol corresponding to the bit combination 01 is −1, indicating that the modulation symbol −1 needs to be sent on the SR resource. A schematic diagram of modulation symbol mapping equivalent to Table 1 is shown in FIG. 3. For a bit combination 00, a modulation symbol on the SR resource is 0, and a modulation symbol on the ACK/NACK resource is −1. Therefore, it indicates that a sending resource corresponding to the bit combination 00 is the ACK/NACK resource, and the sent modulation symbol is −1.

TABLE 1

| Bit combination ($b_{SR}^1$, $b_{A/N}^2$) | Modulation symbol | Resource identifier |
|---|---|---|
| 00 | −1 | 0 |
| 01 | −1 | 1 |
| 10 | 1 | 1 |
| 11 | 1 | 0 |

Form 2: In the mapping relationship, each bit combination corresponds to one first-type modulation symbol and one second-type modulation symbol, and a value that is of one modulation symbol in the first-type modulation symbol and the second-type modulation symbol and that corresponds to a value of the bit combination is 0, and a value that is of the other modulation symbol and that corresponds to the value of the bit combination is not 0; and the first-type modulation symbol needs to be sent on the SR resource, and the second-type modulation symbol needs to be sent on the ACK/NACK resource. It may be understood that the modulation symbol whose value is 0 and that is in the first-type modulation symbol and the second-type modulation symbol that correspond to each bit combination may be considered as not needing to be sent because the value is 0. Therefore, for each bit combination, only the modulation symbol whose value is not 0 needs to be correspondingly sent. Therefore, each bit combination corresponds to one modulation symbol needing to be sent on the SR resource or corresponds to one modulation symbol needing to be sent on the ACK/NACK resource. The UE may determine, based on the mapping relationship, a modulation symbol whose value is not 0 and that is in a first-type modulation symbol and a second-type modulation symbol that correspond to the to-be-transmitted bit combination, and determine a resource corresponding to the modulation symbol whose value is not 0 as the sending resource. Step S102 specifically includes: The UE sends, on the SR resource, the first-type modulation symbol whose value is not 0 and that corresponds to the to-be-transmitted bit combination, or sends, on the ACK/NACK resource, the second-type modulation symbol whose value is not 0 and that corresponds to the to-be-transmitted bit combination.

As shown in Table 2 (below), Table 2 is equivalent to Table 1 and FIG. 3. It is assumed that the first-type modulation symbol is $d_{SR}$, and the second-type modulation symbol is $d_{A/N}$. For example, the bit combination is 10, $d_{SR}$ is 1, and $d_{A/N}$ is 0. It indicates that a corresponding sending resource is the SR resource and a corresponding modulation symbol is 1.

TABLE 2

| Bit combination ($b_{SR}^1$, $b_{A/N}^2$) | $d_{SR}$, $d_{A/N}$ |
|---|---|
| 00 | 0, −1 |
| 01 | −1, 0 |
| 10 | 1, 0 |
| 11 | 0, 1 |

In an embodiment, the mapping relationship may further include a PUCCH format number. Each quantity of SR bits and each quantity of ACK/NACK bits may correspond to one format number. For example, as shown in Table 3 (below), that a quantity of SR bits is one bit and a quantity of ACK/NACK bits is one bit may correspond to a format number. That a quantity of SR bits is two bits and a quantity of ACK/NACK bits is one bit may correspond to another format number.

TABLE 3

| PUCCH format number | Bit combination ($b_{SR}^1$, $b_{A/N}^2$) | $d_{SR}$, $d_{A/N}$ |
|---|---|---|
| x | 00 | 0, −1 |
|  | 01 | −1, 0 |
|  | 10 | 1, 0 |
|  | 11 | 0, 1 |

It may be understood that bit combinations corresponding to the resource do not include a bit combination corresponding to a modulation symbol being 0. For example, as shown in FIG. 3, bit combinations corresponding to the SR resource are 01 and 10, and do not include 00 and 11; and bit combinations corresponding to the ACK/NACK resource are 00 and 11, and do not include 01 and 10.

The schematic diagram of modulation symbol mapping shown in FIG. 3 is used as an example. Bit combinations corresponding to modulation symbols sent on the SR resource include 01 and 10, SR bits in the two bit combinations have two values: 0 and 1, and ACK/NACK bits in the two bit combinations also have two values: 1 and 0. Bit combinations corresponding to modulation symbols sent on the ACK/NACK resource include 00 and 11, SR bits in the two bit combinations have two values: 0 and 1, and ACK/NACK bits in the two bit combinations also have two values: 0 and 1. Therefore, the foregoing Embodiment 3 is satisfied. It may be understood that if the bit combinations corresponding to the modulation symbols sent on the SR resource include 01, 10, and 00, and the bit combinations corresponding to the modulation symbols sent on the ACK/NACK resource include 11, the foregoing Embodiment 1 is satisfied. If the bit combinations corresponding to the modulation symbols sent on the ACK/NACK resource include 01, and the bit combinations corresponding to the modulation symbols sent on the ACK/NACK resource include 11, 10, and 00, the foregoing Embodiment 2 is satisfied.

Figure 4A:
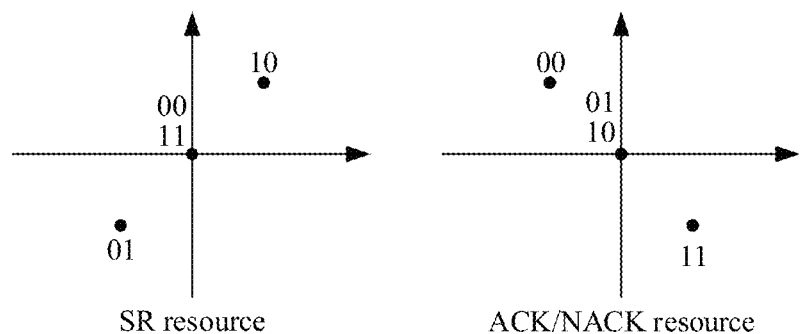
FIG. 4(a) and FIG. 4(b) are each another schematic diagram of modulation symbol mapping according to an embodiment of the present invention.
Figure 4B:
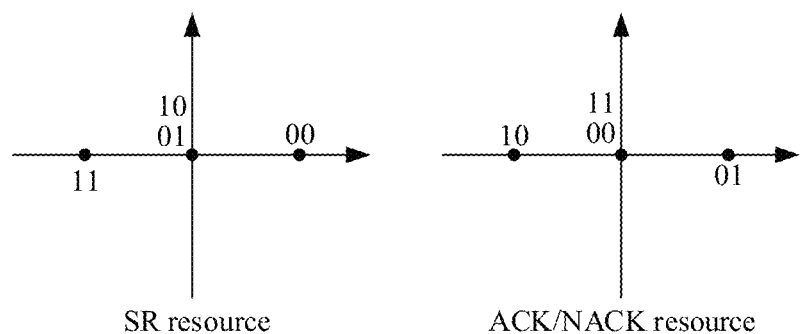

When the SR bit and the ACK/NACK each are one bit, the schematic diagram of modulation symbol mapping may alternatively be shown in FIG. 4(a) and FIG. 4(b). Bit combinations corresponding to modulation symbols sent on the SR resource in FIG. 4(a) are the same as the bit combinations corresponding to the modulation symbols sent on the SR resource in FIG. 3, but the modulation symbols sent on the SR resource in FIG. 4(a) are different from the modulation symbols sent on the SR resource in FIG. 3. Bit combinations corresponding to modulation symbols sent on the ACK/NACK resource in FIG. 4(a) are the same as the bit combinations corresponding to the modulation symbols sent on the ACK/NACK resource in FIG. 3, but the modulation symbols sent on the ACK/NACK resource in FIG. 4(a) are different from the modulation symbols sent on the ACK/NACK resource in FIG. 3. The bit combinations corresponding to the modulation symbols sent on the SR resource in FIG. 4(b) are the same as the bit combinations corresponding to the modulation symbols sent on the ACK/NACK resource in FIG. 3, and the bit combinations corresponding to the modulation symbols sent on the ACK/NACK resource in FIG. 4(b) are the same as the bit combinations corresponding to the modulation symbols sent on the SR resource in FIG. 3.

Figure 5A:
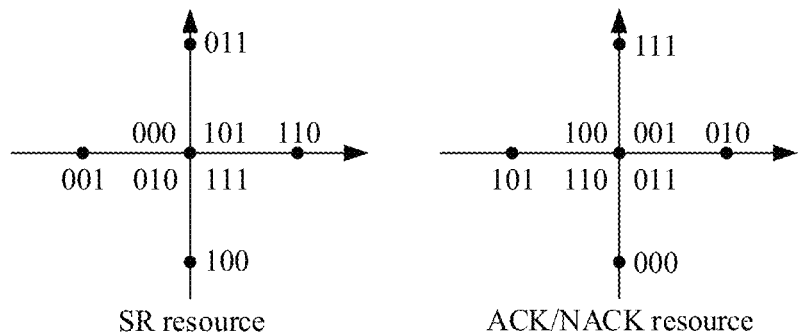
FIG. 5(a) and FIG. 5(b) are each another schematic diagram of modulation symbol mapping according to an embodiment of the present invention.
Figure 5B:
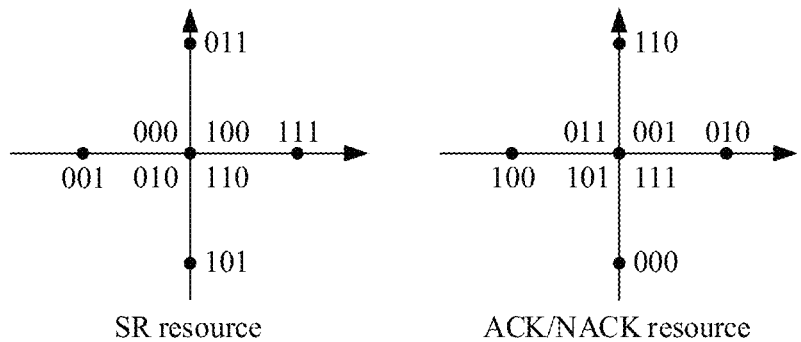

In an embodiment, when the SR is one bit and the ACK/NACK is two bits, the schematic diagram of modulation symbol mapping may be, for example, shown in FIG. 5(a) and FIG. 5(b). In FIG. 5(a), bit combinations corresponding to modulation symbols sent on the SR resource include 001, 011, 100, and 110, SR bits in the four bit combinations have two values: 0 and 1, and ACK/NACK bits in the four bit combinations have four values: 00, 01, 10, and 11; and bit combinations corresponding to modulation symbols sent on the ACK/NACK resource include 000, 010, 101, and 111, SR bits in the four bit combinations have two values: 0 and 1, and ACK/NACK bits in the four bit combinations have four values: 00, 01, 10, and 11. Therefore, the foregoing Embodiment 3 is satisfied. A modulation symbol mapping table equivalent to FIG. 5(a) is shown in Table 4 below. Table 4 uses the foregoing Form 2. It may be understood that, Table 4 may alternatively use the foregoing Form 1. For conversion between Form 1 and Form 2, refer to the foregoing Table 1 and Table 2.

TABLE 4

| Bit combination ($b_{SR}^1$, $b_{A/N}^2$, $b_{A/N}^3$) | $d_{SR}$, $d_{A/N}$ |
|---|---|
| 000 | 0, −j |
| 001 | −1, 0 |
| 010 | 0, 1 |
| 011 | j, 0 |
| 100 | −j, 0 |
| 101 | 0, −1 |
| 110 | 1, 0 |
| 111 | 0, j |

In FIG. 5(b), bit combinations corresponding to modulation symbols sent on the SR resource include 001, 011, 101, and 111, SR bits in the four bit combinations have two values: 0 and 1, and ACK/NACK bits in the four bit combinations have two values: 01 and 11; and bit combinations corresponding to modulation symbols sent on the ACK/NACK resource include 000, 010, 100, and 110, SR bits in the four bit combinations have two values: 0 and 1, and ACK/NACK bits in the four bit combinations also have two values: 00 and 10.

Figure 6A:
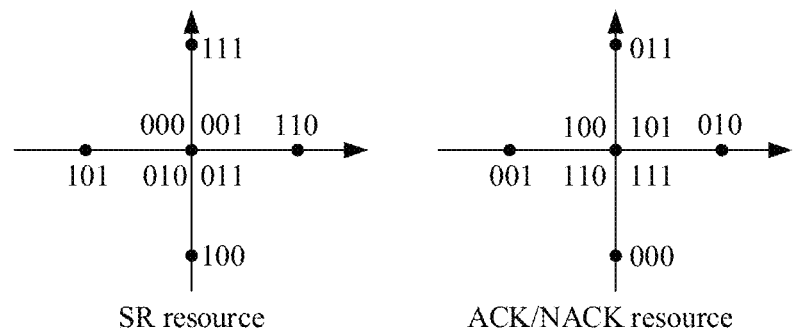
FIG. 6(a) and FIG. 6(b) are each another schematic diagram of modulation symbol mapping according to an embodiment of the present invention.
Figure 6B:
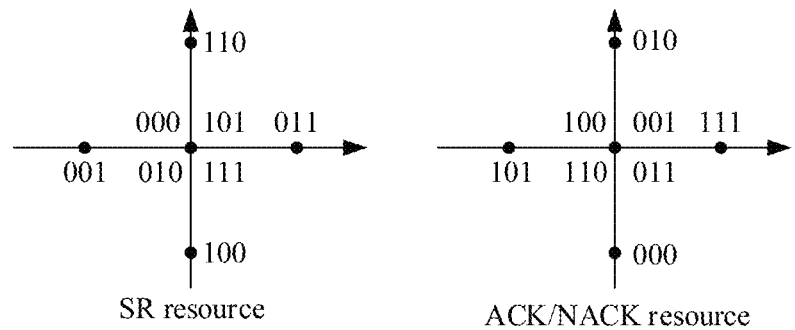

In an embodiment, when the SR is two bits and the ACK/NACK is one bit, the schematic diagram of modulation symbol mapping may be, for example, shown in FIG. 6(a) and FIG. 6(b). In FIG. 6(a), bit combinations corresponding to modulation symbols sent on the SR resource include 100, 101, 110, and 111, SR bits in the four bit combinations have two values: 10 and 11, and ACK/NACK bits in the four bit combinations have two values: 0 and 1; and bit combinations corresponding to modulation symbols sent on the ACK/NACK resource include 000, 001, 010, and 011, SR bits in the four bit combinations have two values: 00 and 01, and ACK/NACK bits in the four bit combinations also have two values: 0 and 1. A modulation symbol mapping table equivalent to FIG. 6(a) is shown in Table 5 below. Table 5 uses the foregoing Form 2. It may be understood that, Table 5 may alternatively use the foregoing Form 1. For conversion between Form 1 and Form 2, refer to the foregoing Table 1 and Table 2.

TABLE 5

| Bit combination ($b_{SR}^1$, $b_{SR}^2$, $b_{A/N}^3$) | $d_{SR}$, $d_{A/N}$ |
|---|---|
| 000 | 0, −j |
| 001 | 0, −1 |
| 010 | 0, j |
| 011 | 0, 1 |
| 100 | −j, 0 |
| 101 | −1, 0 |
| 110 | j, 0 |
| 111 | 1, 0 |

In FIG. 6(b), bit combinations corresponding to modulation symbols sent on the SR resource include 100, 001, 110, and 011, SR bits in the four bit combinations have four values: 00, 01, 10, and 11, and ACK/NACK bits in the four bit combinations have two values: 0 and 1; and bit combinations corresponding to modulation symbols sent on the ACK/NACK resource include 000, 101, 010, and 111, SR bits in the four bit combinations have four values: 00, 01, 10, and 11, and ACK/NACK bits in the four bit combinations have two values: 0 and 1.

Figure 7A:
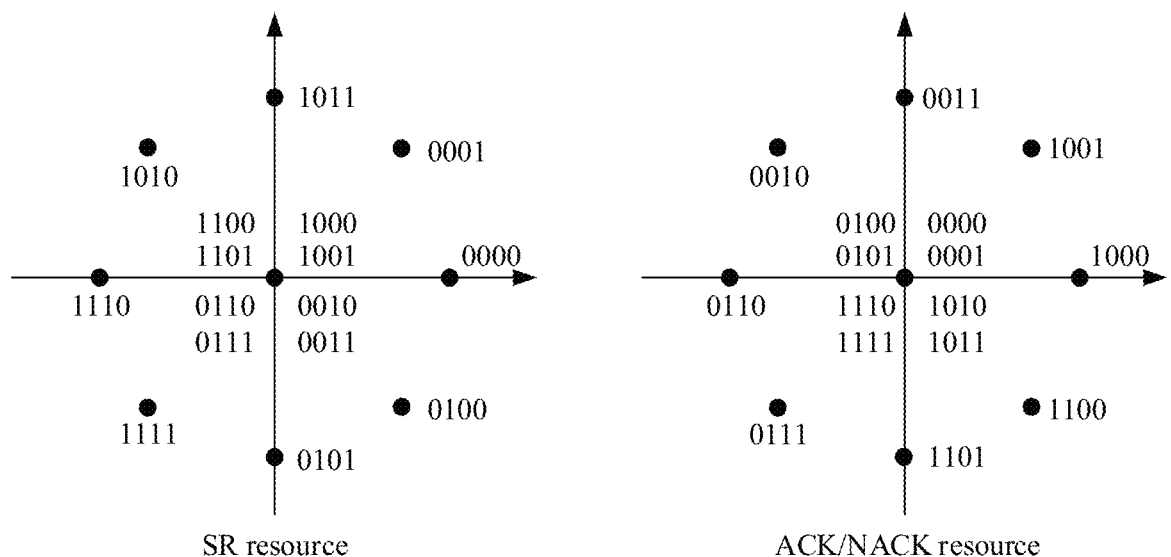
FIG. 7(a), FIG. 7(b), and FIG. 7(c) are each another schematic diagram of modulation symbol mapping according to an embodiment of the present invention.
Figure 7B:
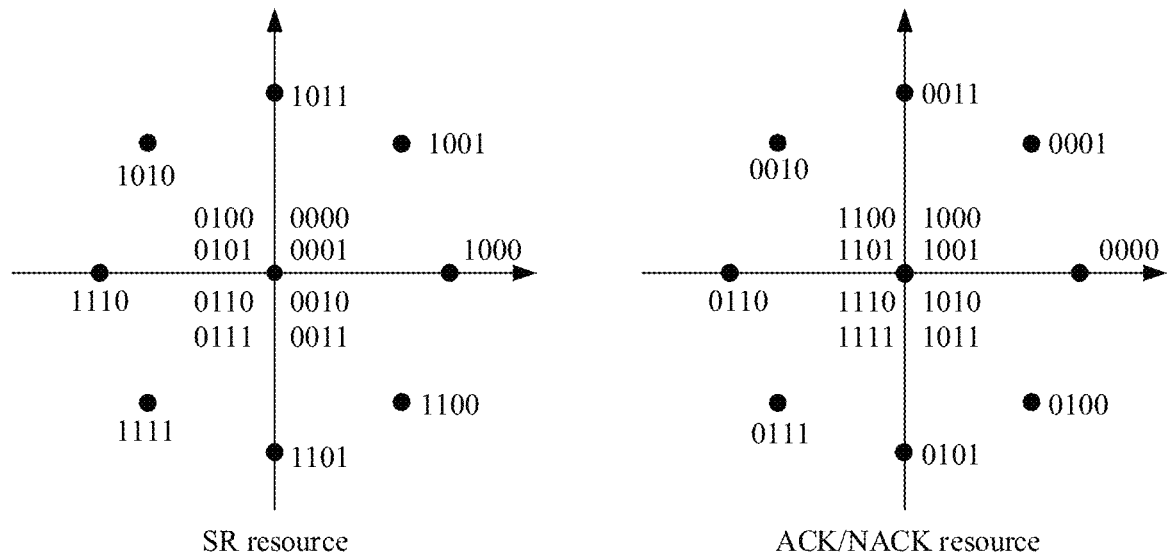

In an embodiment, when the SR is two bits and the ACK/NACK is two bits, the schematic diagram of modulation symbol mapping may be, for example, shown in FIG. 7(a) and FIG. 7(b). In FIG. 7(a), bit combinations corresponding to modulation symbols sent on the SR resource include 0000, 0001, 0100, 0101, 1010, 1011, 1110, and 1111, SR bits in the eight bit combinations have four values: 00, 01, 10, and 11, and ACK/NACK bits in the eight bit combinations have four values: 00, 01, 10, and 11; and bit combinations corresponding to modulation symbols sent on the ACK/NACK resource include 1000, 1001, 0010, 0011, 0110, 0111, 1100, and 1101, SR bits in the eight bit combinations have four values: 00, 01, 10, and 11, and ACK/NACK bits in the eight bit combinations have four values: 00, 01, 10, and 11.

In FIG. 7(b), bit combinations corresponding to modulation symbols sent on the SR resource include 1000, 1001, 1010, 1011, 1100, 1101, 1110, and 1111, SR bits in the eight bit combinations have two values: 10 and 11, and ACK/NACK bits in the eight bit combinations have four values: 00, 01, 10, and 11; and bit combinations corresponding to modulation symbols sent on the ACK/NACK resource include 0000, 0001, 0010, 0011, 0100, 0101, 0110, and 0111, SR bits in the eight bit combinations have two values: 00 and 01, and ACK/NACK bits in the eight bit combinations have four values: 00, 01, 10, and 11. A modulation symbol mapping table equivalent to FIG. 7(b) is shown in Table 6 below. Table 6 uses the foregoing Form 2. It may be understood that, Table 6 may alternatively use the foregoing Form 1. For conversion between Form 1 and Form 2, refer to the foregoing Table 1 and Table 2.

TABLE 6

| Bit combination ($b_{SR}^1$, $b_{SR}^2$, $b_{A/N}^3$, $b_{A/N}^4$) | $d_{SR}$, $d_{A/N}$ |
|---|---|
| 0000 | 0, 1 |
| 0001 | 0, $e^{j\pi/4}$ |
| 0010 | 0, $e^{j3\pi/4}$ |
| 0011 | 0, j |
| 0100 | 0, $e^{-j\pi/4}$ |
| 0101 | 0, −j |
| 0110 | 0, −1 |
| 0111 | 0, $e^{-j3\pi/4}$ |
| 1000 | 1, 0 |
| 1001 | $e^{j\pi/4}$, 0 |
| 1010 | $e^{j3\pi/4}$, 0 |
| 1011 | j, 0 |
| 1100 | $e^{-j\pi/4}$, 0 |
| 1101 | −j, 0 |
| 1110 | −1, 0 |
| 1111 | $e^{-j3\pi/4}$, 0 |

Figure 7C:
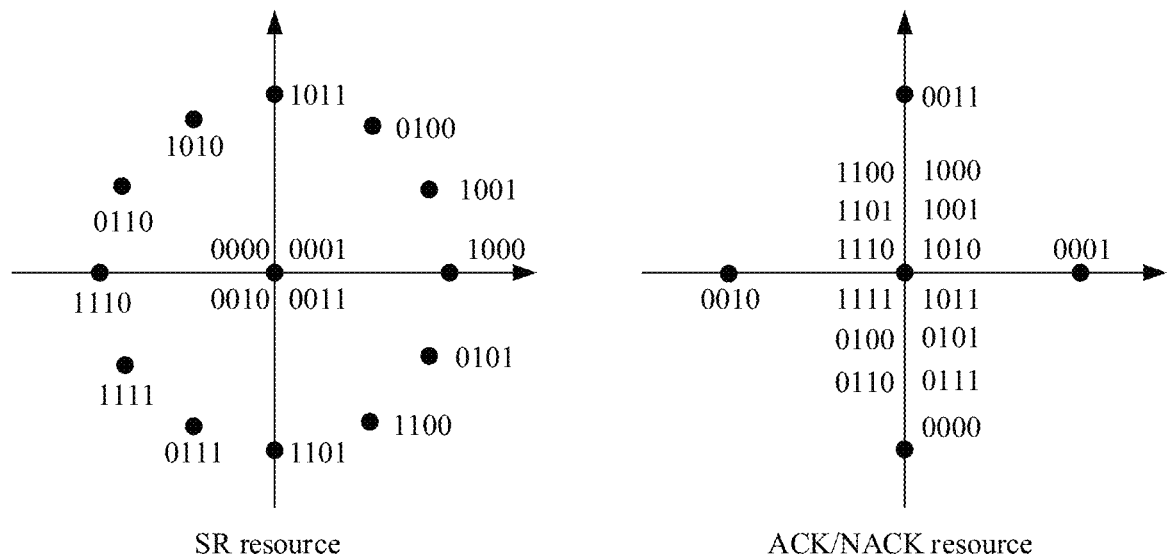

In FIG. 7(c), bit combinations corresponding to modulation symbols sent on the SR resource include 0100, 0101, 0110, 0111, 1000, 1001, 1010, 1011, 1100, 1101, 1110, and 1111, SR bits in the twelve bit combinations have three values: 01, 10 and 11, and ACK/NACK bits in the twelve bit combinations have four values: 00, 01, 10, and 11; and bit combinations corresponding to modulation symbols sent on the ACK/NACK resource include 0000, 0001, 0010, and 0011, SR bits in the four bit combinations have one value: 00, and ACK/NACK bits in the four bit combinations have four values: 00, 01, 10, and 11. It may be learned that the foregoing Embodiment 1 is satisfied in FIG. 7(c).

It may be understood that FIG. 3 to FIG. 7 are each merely an example. The mapping relationship may be in another form. This is not limited herein. For example, based on any graph in FIG. 3 to FIG. 7, the modulation symbols may be rotated by any angle by using an origin of a constellation diagram as a circle center, or each bit at any position of all the modulation symbols are negated, or positions of all bits at any position of the modulation symbol are exchanged with positions of all bits at another position.

In an embodiment, alternatively, the SR bit may be three or more bits. A schematic diagram of modulation symbol mapping of the SR bit is similar to those described above. Details are not described herein again.

In an embodiment, alternatively, the ACK/NACK bit may be three or more bits. A schematic diagram of modulation symbol mapping of the ACK/NACK bit is similar to those described above. Details are not described herein again.

Figure 8:
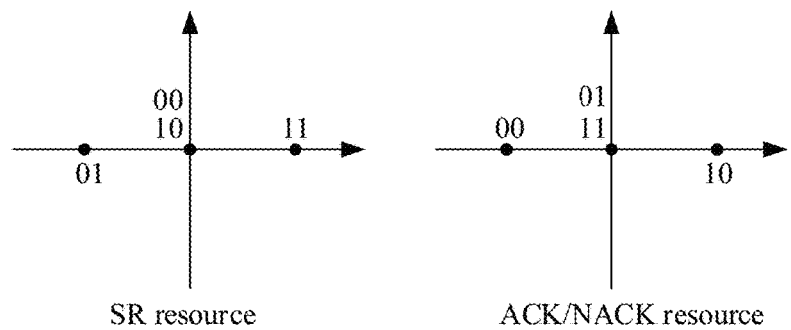
FIG. 8 is an example diagram of modulation symbol mapping.

FIG. 8 is an example diagram of modulation symbol mapping. Bit combinations corresponding to modulation symbols sent on the SR resource include 01 and 11, and bit combinations corresponding to modulation symbols sent on the ACK/NACK resource include 00 and 10. In this case, in the bit combinations corresponding to the modulation symbols sent on the SR resource, SR bits have two values: 0 and 1, and ACK/NACK bits have only one value: 1. In the bit combinations corresponding to the modulation symbols sent on the ACK/NACK resource, SR bits have two values: 0 and 1, and ACK/NACK bits have only one value: 0. Therefore, FIG. 8 does not satisfy the foregoing Embodiment 1, Embodiment 2, and Embodiment 3. To describe an effect difference between the scheme shown in FIG. 8 and the scheme of this application, the following compares an effect of the scheme shown in FIG. 8 with an effect of the scheme shown in FIG. 3.

Assuming that modulation symbols sent on the SR resource and the ACK/NACK resource are respectively $x_1$ and $x_2$, received symbols are respectively $y_1$ and $y_2$, and noise signals are $n_1$ and $n_2$, $$y_1 = h_1 x_1 + n_1$$

$$y_2 = h_2 x_2 + n_2$$

To simplify analysis, it is assumed herein that $h_1 = h_2 = 1$, $n_1$ and $n_2$ comply with real Gaussian distribution, an average value of $n_1$ and $n_2$ is 0, a variance of $n_1$ and $n_2$ is $\sigma^2$, and $n_1$ and $n_2$ are independent of each other.

If the modulation symbol mapping manner shown in FIG. 3 is used, distances between two symbols corresponding to 00 and 01 are both 1, and a probability that a corresponding sent bit is 00 and a receiving decision is 01 may be expressed as:

$$P(00 \to 01 | y_1, y_2) = P(n_1 < -\tfrac{1}{2}) P(\tfrac{1}{2} < n_2 < 3/2)$$

Distances between two symbols corresponding to 00 and 10 are both 1, and a probability that a corresponding sent bit is 00 and a receiving decision is 10 may be expressed as:

$$P(00 \to 10 | y_1, y_2) = P(n_1 > \tfrac{1}{2}) P(\tfrac{1}{2} < n_2 < 3/2)$$

Distances between two symbols corresponding to 00 and 11 are 0 and 2, and a probability that a corresponding sent bit is 00 and a receiving decision is 11 may be expressed as:

$$P(00 \to 11 | y_1, y_2) = P(n_2 > 3/2)$$

Similarly, $$P(01 \to 00 | y_1, y_2) = P(\tfrac{1}{2} < n_1 < 3/2) P(n_2 < -\tfrac{1}{2})$$

$$P(01 \to 10 | y_1, y_2) = P(n_1 > 3/2)$$

$$P(01 \to 11 | y_1, y_2) = P(\tfrac{1}{2} < n_1 < 3/2) P(n_2 > \tfrac{1}{2})$$

$$P(10 \to 00 | y_1, y_2) = P(-3/2 < n_1 < -\tfrac{1}{2}) P(n_2 < -\tfrac{1}{2})$$

$$P(10 \to 01 | y_1, y_2) = P(n_1 < -3/2)$$

$$P(10 \to 11 | y_1, y_2) = P(-3/2 < n_1 < -\tfrac{1}{2}) P(n_2 > \tfrac{1}{2})$$

$$P(11 \to 00 | y_1, y_2) = P(n_2 < -3/2)$$

$$P(11 \to 01 | y_1, y_2) = P(-3/2 < n_2 < -\tfrac{1}{2}) P(n_1 < -\tfrac{1}{2})$$

$$P(11 \to 10 | y_1, y_2) = P(-3/2 < n_2 < -\tfrac{1}{2}) P(n_1 > \tfrac{1}{2})$$

Based on symmetry of the real Gaussian distribution, bit error rates of the two bits may be both expressed as:

$$P_{11}(0 \to 1 | y_1, y_2) = P_{12}(0 \to 1 | y_1, y_2) = P(n_1 > \tfrac{1}{2}) P(\tfrac{1}{2} < n_2 < 3/2) + P(n_2 > 3/2)$$

If the modulation symbol mapping manner shown in FIG. 8 is used, similarly, probabilities that a sent bit is 00 and receiving decisions are 01, 10, and 11 may be obtained:

$$P(00 \to 11 | y_1, y_2) = P(n_1 < -\tfrac{1}{2}) P(\tfrac{1}{2} < n_2 < 3/2)$$

$$P(00 \to 10 | y_1, y_2) = P(n_2 > 3/2)$$

$$P(00 \to 11 | y_1, y_2) = P(n_1 > \tfrac{1}{2}) P(\tfrac{1}{2} < n_2 < 3/2)$$

Based on symmetry of the real Gaussian distribution, a bit error rate of the first bit may be expressed as:

$$P_{21}(0 \to 1 | y_1, y_2) = P(n_1 > \tfrac{1}{2}) P(\tfrac{1}{2} < n_2 < 3/2) + P(n_2 > 3/2),$$

and a bit error rate of the second bit may be expressed as:

$$P_{22}(0 \to 1 | y_1, y_2) = 2 P(n_1 > \tfrac{1}{2}) P(\tfrac{1}{2} < n_2 < 3/2)$$

For Gaussian distribution, $P(\tfrac{1}{2} < n_1 < 3/2) P(n_2 > \tfrac{1}{2}) > P(n_2 > 3/2)$, and therefore, $$P_{11}(0 \to 1 | y_1, y_2) = P_{21}(0 \to 1 | y_1, y_2)$$

$$P_{12}(0 \to 1 | y_1, y_2) < P_{22}(0 \to 1 | y_1, y_2)$$

Therefore, modulation symbol distribution corresponding to FIG. 3 is better than modulation symbol distribution corresponding to FIG. 8.

Figure 9:
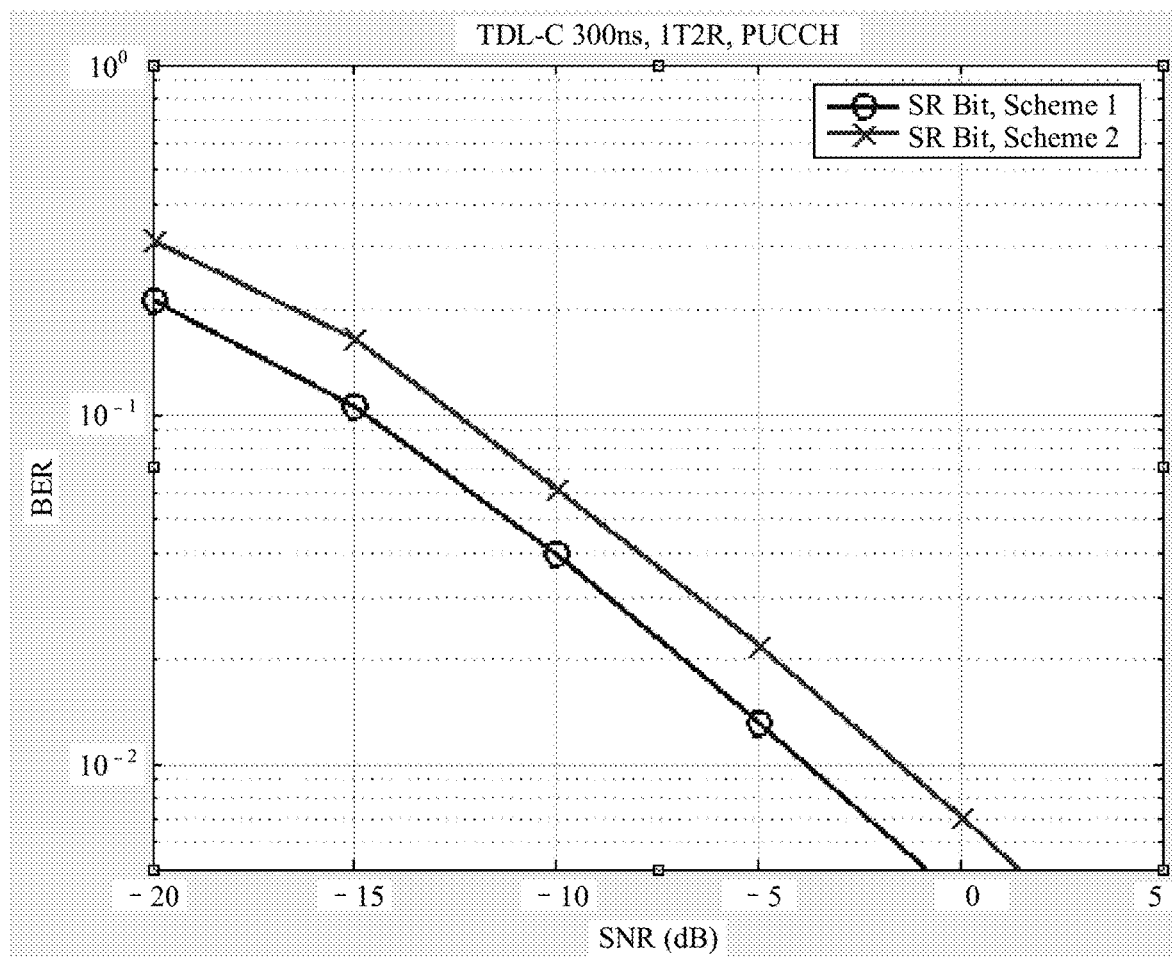
FIG. 9 is a schematic diagram of gain simulation corresponding to two modulation symbol mapping schemes shown in FIG. 3 and FIG. 8.

It may be obtained that a distance between modulation symbols corresponding to FIG. 3 is greater than a distance between modulation symbols corresponding to FIG. 8. FIG. 9 is a schematic diagram of gain simulation corresponding to two modulation symbol mapping schemes shown in FIG. 3 and FIG. 8, where Scheme 1 corresponds to FIG. 3, and Scheme 2 corresponds to FIG. 8. It can be learned that compared with the scheme in FIG. 8, the scheme in FIG. 3 may increase approximately a gain of 2 dB. Therefore, a bit error rate in FIG. 3 is lower than a bit error rate in FIG. 8. Therefore, the technical solutions in this embodiment of the present invention have higher transmission efficiency and higher reliability.

Further, in an embodiment, in the mapping relationship, a quantity of modulation symbols sent on the SR resource is equal to a quantity of modulation symbols sent on the ACK/NACK resource. As shown in FIG. 3, FIG. 4(a), FIG. 4(b), FIG. 5(a), FIG. 5(b), FIG. 6(a), FIG. 6(b), and FIG.

7(a) and FIG. 7(b), the quantities of modulation symbols sent on the two resources are equal. Specifically, if the mapping relationship uses the foregoing Form 1, in the mapping relationship, a quantity of modulation symbols corresponding to the identifier of the first resource is equal to a quantity of modulation symbols corresponding to the identifier of the second resource. If the mapping relationship uses the foregoing Form 2, in the mapping relationship, a quantity of first-type modulation symbols whose values are not 0 is equal to a quantity of second-type modulation symbols whose values are not 0. In this embodiment, distribution of modulation symbols may be further optimized, and therefore a bit error rate is further reduced, transmission efficiency is improved, a low peak-to-average ratio of a transmitted signal is further ensured, and uplink signal transmission reliability is improved.

Further, in an embodiment, the SR bit has M values, and the ACK/NACK bit has N values. In the mapping relationship, SR bits in bit combinations corresponding to modulation symbols sent on each resource have M values, and ACK/NACK bits in bit combinations corresponding to modulation symbols sent on each resource have N values. Specifically, if the mapping relationship uses the foregoing Form 1, in the mapping relationship; there are M bit combinations corresponding to the identifier of the first resource, and values of SR bits in any two of the M bit combinations are different; and there are N bit combinations corresponding to the identifier of the first resource, and values of ACK/NACK bits in any two of the N bit combinations are different; and there are M bit combinations corresponding to the identifier of the second resource, and values of SR bits in any two of the M bit combinations are different; and there are N bit combinations corresponding to the identifier of the second resource, and values of ACK/NACK bits in any two of the N bit combinations are different. If the mapping relationship uses the foregoing Form 2, in the mapping relationship, there are M bit combinations corresponding to the first-type modulation symbols whose values are not 0, and values of SR bits in any two of the M bit combinations are different; and there are N bit combinations corresponding to the first-type modulation symbols whose values are not 0, and values of ACK/NACK bits in any two of the N bit combinations are different; and there are M bit combinations corresponding to the second-type modulation symbols whose values are not 0, and values of SR bits in any two of the M bit combinations are different; and there are N bit combinations corresponding to the second-type modulation symbols whose values are not 0, and values of ACK/NACK bits in any two of the N bit combinations are different.

Assuming that the quantity of SR bits is s, M may be, for example, $2^s$. For example, when the SR is one bit, M=2. When the SR is two bits, M=4. Alternatively, M may be less than $2^s$, and specifically, may be set based on a quantity of scheduling request values that are actually needed.

Assuming that the quantity of ACK/NACK bits is t, N may be, for example, $2^t$. For example, when the ACK/NACK is one bit, N=2. When the ACK/NACK is two bits, N=4. Alternatively, N may be less than $2^t$, and specifically, may be set based on a quantity of ACK/NACK values that are actually needed.

As shown in FIG. 3, the SR is one bit, and the ACK/NACK is also one bit. In this case, M=2, and N=2. There are two values of the SR bits corresponding to the modulation symbols sent on the SR resource: 0 and 1; and there are two values of the ACK/NACK bits corresponding to the modulation symbols sent on the SR resource: 1 and 0. There are two values of the SR bits corresponding to the modulation symbols sent on the ACK/NACK resource: 0 and 1; and there are two values of the ACK/NACK bits corresponding to the modulation symbols sent on the ACK/NACK resource: 0 and 1. Therefore, FIG. 3 satisfy a condition in this embodiment that "SR bits in bit combinations corresponding to modulation symbols sent on each resource have M values, and ACK/NACK bits in bit combinations corresponding to modulation symbols sent on each resource have N values". Similarly, FIG. 4(a), FIG. 4(b), FIG. 5(a), FIG. 6(b), and FIG. 7(a) also meet the condition in this embodiment. In this embodiment, distribution of modulation symbols may be further optimized, and therefore a bit error rate is further reduced, transmission efficiency is improved, a low peak-to-average ratio of a transmitted signal is further ensured, and uplink signal transmission reliability is improved.

Further, in the mapping relationship, in the M values of the SR bits corresponding to the modulation symbols sent on the same resource, a quantity of bit combinations corresponding to each value is the same; in the N values of the ACK/NACK bits corresponding to the modulation symbols sent on the same resource, a quantity of bit combinations corresponding to each value is the same. Specifically, if the mapping relationship uses the foregoing Form 1, in the mapping relationship, in bit combinations corresponding to each value of the SR bits, half of the bit combinations correspond to the identifier of the first resource, and the other half of the bit combinations correspond to the identifier of the second resource; and in bit combinations corresponding to each value of the ACK/NACK bits, half of the bit combinations correspond to the identifier of the first resource, and the other half of the bit combinations correspond to the identifier of the second resource. If the mapping relationship uses the foregoing Form 2, in the mapping relationship, in bit combinations corresponding to each value of the SR bits, half of the bit combinations correspond to the first-type modulation symbol whose value is not 0, and the other half of the bit combinations correspond to the second-type modulation symbol whose value is not 0; and in bit combinations corresponding to each value of the ACK/NACK bits, half of the bit combinations correspond to the first-type modulation symbol whose value is not 0, and the other half of the bit combinations correspond to the second-type modulation symbol whose value is not 0.

As shown in FIG. 3, there are two bit combinations in which values of SR bits are 0, a modulation symbol corresponding to one bit combination is sent by using the SR resource, and a modulation symbol corresponding to the other bit combination is sent by using the ACK/NACK resource. There are two bit combinations in which values of SR bits are 1, a modulation symbol corresponding to one bit combination is sent by using the SR resource, and a modulation symbol corresponding to the other bit combination is sent by using the ACK/NACK resource. There are two bit combinations in which values of ACK/NACK bits are 0, a modulation symbol corresponding to one bit combination is sent by using the SR resource, and a modulation symbol corresponding to the other bit combination is sent by using the ACK/NACK resource. There are two bit combinations in which values of ACK/NACK bits are 1, a modulation symbol corresponding to one bit combination is sent by using the SR resource, and a modulation symbol corresponding to the other bit combination is sent by using the ACK/NACK resource. Similarly, FIG. 4(a), FIG. 4(b), FIG. 5(a), FIG. 6(b), and FIG. 7(a) also satisfy a condition that "in the M values of the SR bits corresponding to the modulation symbols sent on the same resource, a quantity of bit combinations corresponding to each value is the same; and in the N values of the ACK/NACK bits corresponding to the modulation symbols sent on the same resource, a quantity of bit combinations corresponding to each value is the same". In this embodiment, distribution of modulation symbols may be further optimized, and therefore a bit error rate is further reduced, transmission efficiency is improved, a low peak-to-average ratio of a transmitted signal is further ensured, and uplink signal transmission reliability is improved.

Further, in an embodiment, the mapping relationship further specifically satisfies that a distance between each modulation symbol and an origin in a constellation diagram in which the modulation symbol is located is equal. For example, the distance between each modulation symbol and the origin in the constellation diagram in which the modulation symbol is located is 1. This is more beneficial for constellation diagram power normalization.

Further, in an embodiment, the mapping relationship further specifically satisfies that the modulation symbols corresponding to the same resource are evenly distributed relative to an origin in a constellation diagram. FIG. 7(b) is used as an example. An included angle between connecting lines from every pair of neighboring modulation symbols to the origin is equal. Distribution of modulation symbols may be further optimized, and therefore a bit error rate is further reduced, transmission efficiency is improved, a low peak-to-average ratio of a transmitted signal is further ensured, and uplink signal transmission reliability is improved.

It may be understood that the preset mapping relationship between bit combinations and modulation symbols may also be understood as a mapping relationship among SR bits, ACK/NACK bits, and modulation symbols. In the mapping relationship, the SR bit and the ACK/NACK bit may be considered as a whole, to be specific, the SR bit and the ACK/NACK bit may be considered as a bit combination. For example, Table 2 may be equivalent to Table 7 below.

TABLE 7

| $b_{SR}$ | $b_{AN}$ | $d_{SR}$, $d_{A/N}$ |
|---|---|---|
| 0 | 0 | 0, −1 |
| 0 | 1 | −1, 0 |
| 1 | 0 | 1, 0 |
| 1 | 1 | 0, 1 |

The process of determining the to-be-transmitted bit combination in step S100 may also be understood as a process of determining a to-be-transmitted SR bit and ACK/NACK bit.

As shown in FIG. 3, if the UE currently does not need to send the SR, and needs to request the base station to perform retransmission, the SR bit is 0, and the ACK/NACK bit is 1. Therefore, the to-be-transmitted bit combination is 01, a modulation symbol determined based on the mapping relationship is −1, and a sending resource is the SR resource. Therefore, the UE may send the modulation symbol −1 on the SR resource.

Figure 10:
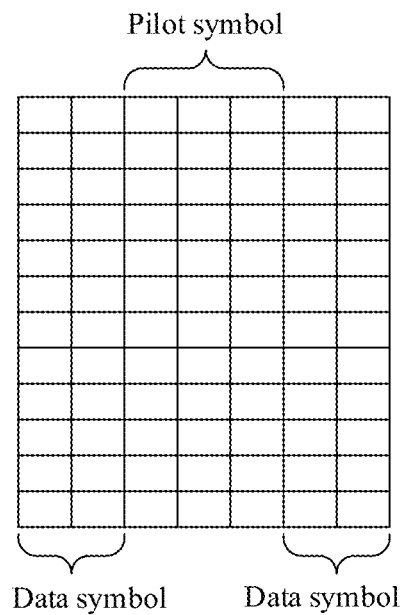
FIG. 10 is an example diagram of a physical resource block.

When sending UCI to the base station, the UE further needs to send a demodulation reference signal (DMRS) to the base station. FIG. 10 is an example diagram of a physical resource block. If a normal cyclic prefix is used, each PRB corresponds to seven orthogonal frequency division multiplexing (OFDM) symbols and 12 subcarriers. Three middle OFDM symbols may be used to send a DMRS. The other four OFDM symbols may be used to send a modulation symbol.

Specifically, sending the modulation symbol includes: multiplying the modulation symbol by a spreading sequence and then mapping the modulation symbol to an OFDM symbol. A length of the spreading sequence may be, for example, 12. As shown in FIG. 10, the modulation symbol is multiplied by a spreading sequence whose length is 12 and then is mapped to an OFDM symbol.

The spreading sequence may alternatively repeat on several OFDM symbols. As shown in FIG. 10, the modulation symbol may be multiplied by an orthogonal cover code (OCC) whose length is 4, and the modulation symbol is repeatedly sent on the four OFDM symbols shown in FIG. 10.

Specifically, assuming that the modulation symbol is represented by $d_{SR}$, a spreading sequence corresponding to $d_{SR}$ may be represented as:

$$y_p^{SR}(n) = \frac{1}{\sqrt{P}} d_{SR} \cdot r_{u,v}^{\alpha_p^{SR}}(n), n = 0, 1, \ldots, N_{seq}^{PUCCH} - 1,$$

where

P is a quantity of antenna ports, $\alpha_p^{SP}$ is a sequence cyclic shift parameter corresponding to an antenna port p, $N_{seq}^{PUCCH}$ is a sequence length, and $r_{u,v}^{\alpha_p^{SR}}(n)$ is a base sequence with a cyclic shift of $\alpha_p^{SR}$, a group number of u, and a sequence number of v. The sequence $y_p^{SR}(n)$ is further extended onto different OFDM symbols, and a corresponding sequence on each OFDM symbol may be represented as:

$$z_p^{SR}(m \cdot N_{seq}^{PUCCH} + n) = S(n_s) \cdot w_p^{SR}(m) \cdot y_p^{SR}(n),$$

$n = 0, 1, \ldots, N_{seq}^{PUCCH} - 1$ $m = 0, 1, \ldots, N_{SF}^{PUCCH} - 1$, where $S(n_s)$ is a scrambling value corresponding to an $n_s^{th}$ slot, $N_{seq}^{PUCCH}$ is a quantity of OFDM symbols of a data part, and $w_p^{SR}(m)$ is an element, on an $m^{th}$ OFDM symbol, corresponding to an OCC code with a length of $N_{seq}^{PUCCH}$.

Similarly, when the sending resource is the ACK/NACK, a corresponding sequence on each OFDM symbol is the same as that described above. Details are not described herein again.

In addition, for a short PUCCH, one short PUCCH may occupy only one or two OFDM symbols. Different from that in the foregoing solution, a length of a used orthogonal cover code may be 1 or 2.

S103: When the SR resource and the ACK/NACK resource that are configured by the base station for the UE are located in a same subframe, receive, on one of the SR resource and the ACK/NACK resource, a modulation symbol sent by the UE.

After allocating the SR resource and the ACK/NACK resource in the same subframe to the UE, the base station cannot determine a resource on which the UE sends the modulation symbol. Therefore, when the subframe in which the SR resource and the ACK/NACK resource are located arrives, the base station needs to simultaneously perform detection on the SR resource and the ACK/NACK resource, and may receive a signal on one of the resources.

Specifically, which modulation symbol the received signal may be identified in the following manner:

First, each modulation symbol corresponding to the resource on which the signal is received is determined, and may be referred to as a to-be-determined modulation symbol below.

Then, the received signal and each to-be-determined modulation symbol are substituted into the following formula: $d=\|y_1-h_1x_1\|^2+\|y_2-h_2x_2\|^2$, to determine a to-be-determined modulation symbol corresponding to a minimum squared distance d as the received modulation symbol.

S104. The base station determines, based on the preset mapping relationship between bit combinations and modulation symbols and the resource used to receive the modulation symbol, a bit combination corresponding to the received modulation symbol, and determines the SR bit and the ACK/NACK bit.

The corresponding bit combination may be determined with reference to the foregoing mapping relationship. Details are not described herein again.

The base station and the UE already agree on a combination rule of the bit combination. Therefore, the base station may split the determined bit combination into the SR bit and the ACK/NACK bit according to the agreed-on combination rule.

For example, the determined bit combination is 011, the SR is one bit, the ACK/NACK is two bits, and the bit combination is in a form of SR+ACK/NACK. Therefore, the base station may determine that the SR bit is 0, and the ACK/NACK bit is 11.

Embodiments of the present invention further provides a control information transmission method. Different from the foregoing embodiment, in the method, UE sends UCI to a base station in a sequence selection manner. The UE does not need to send a DMRS to the base station.

The base station configures an SR resource by using higher layer signaling. The SR resource includes a time domain resource, a frequency domain resource, and a code domain resource. The code domain resource includes at least two spreading sequences. A quantity of spreading sequences included in the code domain resource is $2^s$, where s is a quantity of SR bits. In the following embodiment, the spreading sequences included in the code domain resource in the SR resource configured by the base station are referred to as a first sequence.

The base station may configure, by using a PDCCH, an ACK/NACK resource used when the UE feeds back an ACK/NACK. For example, the base station sends DCI to the UE, and the UE may determine, based on a resource used to receive the DCI, a resource that should be used to feed back the ACK/NACK, that is, the foregoing ACK/NACK resource. This manner may be considered as that the base station configures the ACK/NACK resource for the UE. The ACK/NACK resource includes a time domain resource, a frequency domain resource, and a code domain resource. The code domain resource includes at least two spreading sequences. A quantity of spreading sequences included in the code domain resource is $2^t$, where t is a quantity of ACK/NACK bits. In the following embodiment, the spreading sequences included in the code domain resource in the ACK/NACK resource configured by the base station are referred to as a second sequence.

Figure 11:
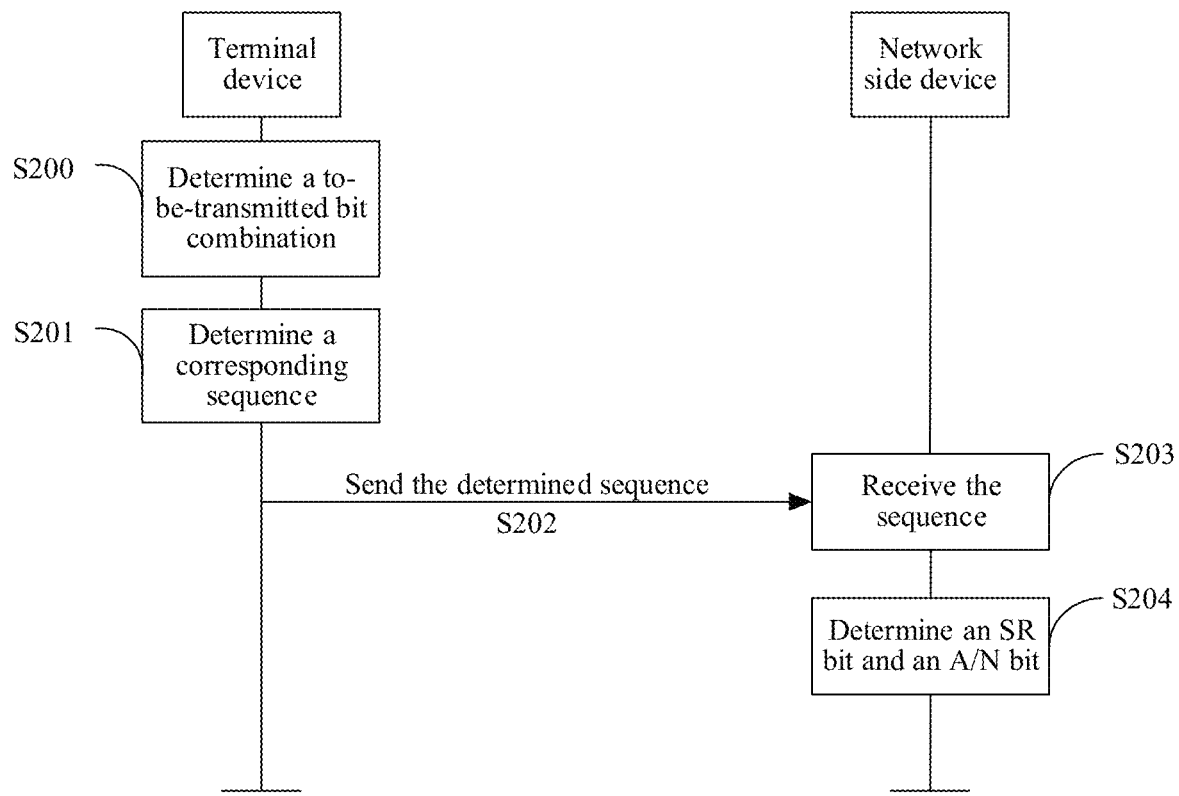
FIG. 11 is another example flowchart of a control information transmission method according to an embodiment of the present invention.

When the time domain resource in the SR resource configured by the base station for the UE and the time domain resource in the ACK/NACK resource configured by the base station for the UE are located in a same subframe, if the UE sends a first sequence corresponding to the SR bit in the subframe, and also sends a second sequence corresponding to the ACK/NACK bit in the subframe, the two sequences are superimposed. This increases a peak-to-average ratio and reduces transmission power efficiency and coverage performance. To resolve the problem, in this embodiment, as shown in FIG. 11, the method includes the following steps.

S200: The UE determines a to-be-transmitted bit combination including an SR bit and an ACK/NACK bit.

For specific details about determining the to-be-transmitted bit combination by the UE, refer to the foregoing embodiment. Details are not described herein again.

S201: The UE determines, based on a preset mapping relationship between bit combinations and sequences, a sequence corresponding to the to-be-transmitted bit combination. In the mapping relationship, the bit combination includes an SR bit and an ACK/NACK bit, and each bit combination corresponds to one sequence.

In an embodiment, the mapping relationship may be a preset mapping relationship between bit combinations and sequence identifiers. The sequence identifier may be a sequence number. The bit combination is in a one-to-one correspondence with the sequence.

In an embodiment, the sequence may be the spreading sequence described in the foregoing embodiment.

For example, when the SR is one bit, and the ACK/NACK is also one bit, the mapping relationship between bit combinations and sequences may be, for example, shown in Table 8.

TABLE 8

| Bit combination ($b_{SR}^1$, $b_{A/N}^2$) | Sequence number |
| --- | --- |
| 00 | 0 |
| 01 | 1 |
| 10 | 2 |
| 11 | 3 |

The UE may determine the mapping relationship between bit combinations and sequences in the following manners:

Manner 1:

The base station sends first sequence information to the UE. The UE receives the first sequence information configured by the base station for the UE, where the first sequence information is used to indicate a sequence that should be used to feed back the SR.

In an embodiment, the first sequence information may be the code domain resource in the SR resource configured by the base station described above.

In an embodiment, the base station may send the first sequence information to the UE while sending information about the SR resource to the UE. Alternatively, the base station may separately send the first sequence information and information about the SR resource. The first sequence information may indicate a sequence identifier, for example, a sequence number. The base station may determine, based on a quantity of SR bits, a quantity of first sequences configured for the UE. Assuming that the quantity of SR bits is s, the quantity of first sequences may be, for example, $2^s$. The quantity of sequences indicated by the first sequence information is $2^s$.

The base station sends second sequence information to the UE. The UE receives the second sequence information configured by the base station for the UE, where the second sequence information is used to indicate a sequence that should be used to feed back the ACK/NACK. In an embodiment, the second sequence information may be the code domain resource in the ACK/NACK resource configured by the base station described above. For specific details, refer to the foregoing first sequence information. Details are not described herein again.

It may be understood that, when the SR resource and the ACK/NACK resource are located in a same subframe, the UE neither uses the first sequence information to send only the SR bit, nor uses the second sequence information to send only the ACK/NACK bit. The sequence in the foregoing preset mapping relationship between bit combinations and sequences may include the foregoing first sequence and the foregoing second sequence. Therefore, the first sequence and the second sequence represent a bit combination.

When a sum of a quantity of sequences indicated by the first sequence information and a quantity of sequences indicated by the second sequence information is equal to a quantity of values of the bit combinations, the UE determines the mapping relationship based on the bit combinations and the sequences indicated by the first sequence information and the second sequence information. For example, when the SR is one bit, and the ACK/NACK is also one bit, the quantity of sequences indicated by the first sequence information is 2, and the quantity of sequences indicated by the second sequence information is also 2. A quantity of the bit combinations is 4, and is equal to the sum of the quantity of sequences indicated by the first sequence information and the quantity of sequences indicated by the second sequence information. Therefore, the sequences indicated by the base station for the UE are sufficient for the UE to use.

Specifically, the base station and the UE may agree on an arrangement rule between the bit combinations and the sequences indicated by the two pieces of sequence information.

In an embodiment, the arrangement rule may be: The bit combinations may be arranged in ascending order, and the sequences indicated by the two pieces of sequence information may also be arranged in ascending order of sequence numbers (or in descending order, where the ascending order is shown in Table 8), so that the bit combinations are in a one-to-one correspondence with the sequence numbers. It is assumed that sequence numbers indicated by the first sequence information is 1 and 3, and sequence numbers indicated by the second sequence information is 0 and 2. The mapping relationship between bit combinations and sequences is shown in FIG. 8.

In another embodiment, the arrangement rule may be: The bit combinations may be arranged in ascending order, and then the sequence numbers are arranged in a sequence of the sequence numbers indicated by the first sequence information and the sequence numbers indicated by the second sequence information. In addition, sequence numbers indicated by each piece of sequence information may be arranged in ascending order or in descending order. It is assumed that the sequence numbers indicated by the first sequence information is 1 and 3, and the sequence numbers indicated by the second sequence information is 0 and 2. The mapping relationship between bit combinations and sequences is shown in Table 9.

Manner 2:

The base station sends first sequence information to the UE. The UE receives the first sequence information configured by the base station for the UE. For specific details, refer to the foregoing Manner 1. Details are not described herein again.

The base station sends second sequence information to the UE. The UE receives the second sequence information configured by the base station for the UE. For specific details, refer to the foregoing Manner 1. Details are not described herein again.

When either of the SR and the ACK/NACK is at least two bits, a sum of a quantity of sequences indicated by the first sequence information and a quantity of sequences indicated by the second sequence information is less than a quantity of bit combinations. For example, when the SR is one bit, and the ACK/NACK is two bits, the quantity of bit combinations is 8. The quantity of sequences indicated by the first sequence information is 2, and the quantity of sequences indicated by the second sequence information is 4. Therefore, the sum of the quantity of sequences indicated by the first sequence information and the quantity of sequences indicated by the second sequence information is two less than the quantity of bit combinations.

When the sum of the quantity of sequences corresponding to the first sequence information and the quantity of sequences corresponding to the second sequence information is less than the quantity of bit combinations, the UE may send third sequence information to the UE. The UE receives the third sequence information configured by the base station for the UE, and a quantity of sequences indicated by the third sequence information is equal to a difference obtained by subtracting the sum of the quantity of sequences indicated by the first sequence information and the quantity of sequences indicated by the second sequence information from the quantity of bit combinations. In other words, a sum of the quantity of sequences indicated by the first sequence information, the quantity of sequences indicated by the second sequence information, and the quantity of sequences indicated by the third sequence information is equal to the quantity of bit combinations.

The UE determines the mapping relationship based on the bit combinations and the sequences indicated by the first sequence information, the second sequence information, and the third sequence information.

Specifically, the base station and the UE may agree on an arrangement rule between the bit combinations and the sequences indicated by the three pieces of sequence information. For details of the arrangement rule, refer to the foregoing Manner 1. Details are not described herein again. It is assumed that sequence numbers indicated by the first sequence information are 1 and 3, sequence numbers indicated by the second sequence information are 0, 2, 4 and 5, and sequence numbers indicated by the third sequence information are 6 and 7. The mapping relationship between bit combinations and sequences may be shown in Table 10 and Table 11.

TABLE 9

| Bit combination ($b_{SR}^1$, $b_{A/N}^2$) | Sequence number |
|---|---|
| 00 | 1 |
| 01 | 3 |
| 10 | 0 |
| 11 | 2 |

TABLE 10

| Bit combination ($b_{SR}^1$, $b_{A/N}^2$) | Sequence number |
|---|---|
| 000 | 0 |
| 001 | 1 |
| 010 | 2 |
| 011 | 3 |
| 100 | 4 |
| 101 | 5 |
| 110 | 6 |
| 111 | 7 |

TABLE 11

| Bit combination ($b_{SR}^1$, $b_{A/N}^2$) | Sequence number |
|---|---|
| 000 | 1 |
| 001 | 3 |
| 010 | 0 |
| 011 | 2 |
| 100 | 4 |
| 101 | 5 |
| 110 | 6 |
| 111 | 7 |

Manner 3:

The UE receives first sequence information configured by the base station for the UE. For specific details, refer to the foregoing Manner 1. Details are not described herein again.

The UE receives second sequence information configured by the base station for the UE. For specific details, refer to the foregoing Manner 1. Details are not described herein again.

Different from the foregoing Manner 2, the base station may preconfigure several preset sequences for the UE. When a sum S of a quantity of sequences corresponding to the first sequence information and a quantity of sequences corresponding to the second sequence information is less than a quantity of bit combinations, the UE calculates a difference D between the quantity of bit combinations and the sum S of the quantity of sequences indicated by the first sequence information and the quantity of sequences indicated by the second sequence information. For example, as described above, the quantity of bit combinations is 8 and S is 6. Therefore, D is 2. Then, D sequences are selected from the preconfigured several sequences based on an order agreed on between the UE and the base station. The UE determines the mapping relationship based on the sequences indicated by the first sequence information and the second sequence information, D preconfigured sequences, and the bit combinations. For specific details, refer to the foregoing Manner 2. Details are not described herein again.

Manner 4:

When the base station determines that the SR resource and the ACK/NACK resource that are configured for the UE are located in a same subframe, the base station sends fourth sequence information to the UE. A quantity of sequences indicated by the fourth sequence information is equal to a quantity of bit combinations.

The UE determines the mapping relationship based on the sequences indicated by the fourth sequence information and the bit combinations.

For an arrangement rule between the bit combinations and the sequences indicated by each piece of fourth sequence information, refer to the foregoing manners. Details are not described herein again.

S202. The UE sends the determined sequence.

S203. The base station receives the sequence sent by the UE.

S204. The base station determines, based on the preset mapping relationship between bit combinations and sequences, a bit combination corresponding to the received sequence, to be specific, determines the SR bit and the ACK/NACK bit.

The corresponding bit combination may be determined with reference to the foregoing mapping relationship.

The base station and the UE already agree on a combination rule of the bit combination. Therefore, the base station may split the determined bit combination into the SR bit and the ACK/NACK bit according to the agreed-on combination rule.

For example, the determined bit combination is 011, the SR is one bit, the ACK/NACK is two bits, and the bit combination is in a form of SR+ACK/NACK. Therefore, the base station may determine that the SR bit is 0, and the ACK/NACK bit is 11.

In this embodiment of the present invention, when the SR resource and the ACK/NACK resource that are configured by the base station for the UE are in a same subframe, the UE does not need to simultaneously send the sequence corresponding to the SR and the sequence corresponding to the ACK/NACK, and needs to send only one sequence to indicate SR bit information and ACK/NACK bit information. Data is prevented from being simultaneously sent on two resources located in a same subframe. Therefore, a peak-to-average ratio is lower than that in prior approaches, and transmission power efficiency and coverage performance are higher than those in prior approaches.

Figure 12:
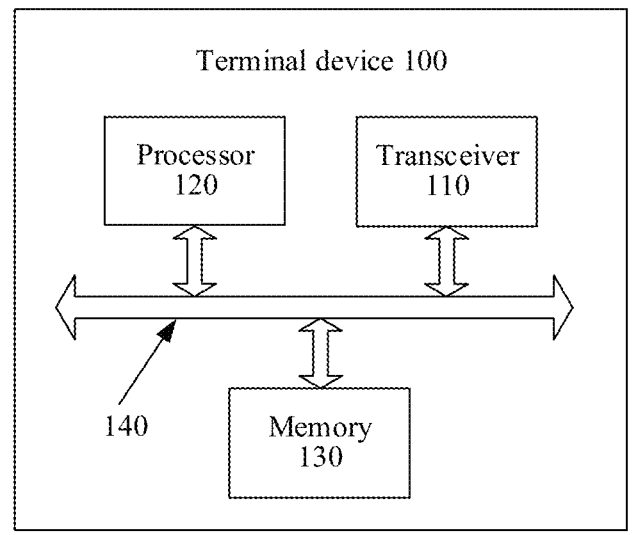
FIG. 12 is an example schematic diagram of a hardware structure of a terminal device according to an embodiment of the present invention.

Embodiments of the present invention further provides a terminal device 100 as described in the foregoing embodiments. As shown in FIG. 12, the terminal device 100 includes a transceiver 110 and a processor 120, and the transceiver 110 is connected to the processor 120. Optionally, the terminal device 100 further includes a memory 130. The memory 130 is connected to the processor 120 and the transceiver 110. Optionally, the terminal device 100 further includes a bus system 140. The processor 120, the transceiver 110, and the memory 130 may be connected by using the bus system 140. The memory 130 may be configured to store an instruction. The processor 120 is configured to execute the instruction stored in the memory 130, to control the transceiver 110 to send and receive a signal. The memory 130 may be further configured to cache data generated when the processor 120 executes the instruction.

The processor 120 is configured to determine, based on a preset mapping relationship between bit combinations and modulation symbols, a modulation symbol corresponding to a to-be-transmitted bit combination and a resource used to send the determined modulation symbol, where in the mapping relationship, the bit combination includes a scheduling request SR bit and an acknowledgment ACK/negative acknowledgment NACK bit; each bit combination corresponds to one modulation symbol needing to be sent on a first resource or corresponds to one modulation symbol needing to be sent on a second resource; and in bit combinations corresponding to modulation symbols sent on at least one of the first resource and the second resource, SR bits in at least two bit combinations are different, and ACK/NACK bits in at least two bit combinations are different.

The transceiver 110 is configured to send, on the determined resource, the modulation symbol corresponding to the to-be-transmitted bit combination.

In this embodiment, the mapping relationship may be pre-stored in the memory 130.

It can be learned from the foregoing embodiment that, the terminal device 100 shown in FIG. 12 performs steps S100, S101, and S102 in the embodiment shown in FIG. 2. Specifically, the transceiver 110 performs step S102 in the embodiment shown in FIG. 2. The processor 120 performs steps S100 and S101 in the embodiment shown in FIG. 2. For more details when the transceiver 110 and the processor 120 perform the foregoing steps, refer to related descriptions in the embodiment shown in FIG. 2. Details are not described herein again.

In this embodiment of the present invention, data is prevented from being simultaneously sent on two resources located in a same subframe. Therefore, a peak-to-average ratio is lower than that in prior approaches, and transmission power efficiency and coverage performance are higher than those in prior approaches.

For other functions of the processor 120 and the transceiver 110, refer to descriptions of the corresponding embodiments in the foregoing control information transmission methods. Details are not described herein again.

In addition, in another embodiment, the processor 120 is configured to determine, based on a preset mapping relationship between bit combinations and sequences, a sequence corresponding to a to-be-transmitted bit combination, where in the mapping relationship, the bit combination includes a scheduling request SR bit and an acknowledgment ACK/negative acknowledgment NACK bit, and each bit combination corresponds to one sequence.

The transceiver 110 is configured to send the determined sequence.

It can be learned from the foregoing embodiment that, the terminal device 100 shown in FIG. 12 performs steps S200, S201, and S202 in the embodiment shown in FIG. 11. Specifically, the transceiver 110 performs step S202 in the embodiment shown in FIG. 11. The processor 120 performs steps S200 and S201 in the embodiment shown in FIG. 11. For more details when the transceiver 110 and the processor 120 perform the foregoing steps, refer to related descriptions in the embodiment shown in FIG. 11. Details are not described herein again.

Figure 13:
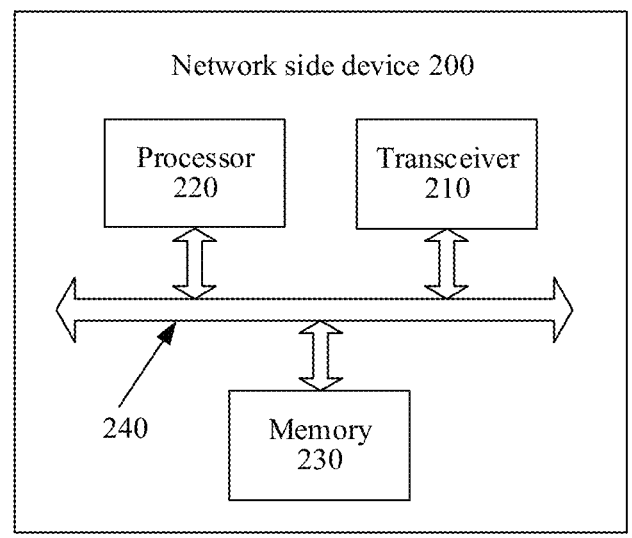
FIG. 13 is an example schematic diagram of a hardware structure of a network side device according to an embodiment of the present invention.

Embodiments of the present invention further provides a network side device 200 as described in the foregoing embodiments. As shown in FIG. 13, the network side device 200 includes a transceiver 210 and a processor 220, and the transceiver 210 is connected to the processor 220. Optionally, the network side device 200 further includes a memory 230. The memory 230 is connected to the processor 220 and the transceiver 210. Optionally, the network side device 200 further includes a bus system 240. The processor 220, the transceiver 210, and the memory 230 may be connected by using the bus system 240. The memory 230 may be configured to store an instruction. The processor 220 is configured to execute the instruction stored in the memory 230, to control the transceiver 210 to send and receive a signal. The memory 230 may be further configured to cache data generated when the processor 220 executes the instruction.

When a first resource and a second resource that are configured by the processor 220 for a terminal device are located in a same subframe, the transceiver 210 is configured to receive, on one of the first resource and the second resource, a modulation symbol sent by the terminal device; and the processor 220 is configured to determine, based on the resource used to receive the modulation symbol and a preset mapping relationship between bit combinations and modulation symbols, a bit combination corresponding to the received modulation symbol, where in the mapping relationship, the bit combination includes a scheduling request SR bit and an acknowledgment ACK/negative acknowledgment NACK bit; each bit combination corresponds to one modulation symbol needing to be sent on the first resource or corresponds to one modulation symbol needing to be sent on the second resource; and in bit combinations corresponding to modulation symbols sent on at least one of the first resource and the second resource, SR bits in at least two bit combinations are different, and ACK/NACK bits in at least two bit combinations are different.

In this embodiment, the mapping relationship may be pre-stored in the memory 230.

It can be learned from the foregoing embodiment that, the network side device shown in FIG. 13 performs steps S103 and S104 in the embodiment shown in FIG. 2. Specifically, the transceiver 210 performs step S103 in the embodiment shown in FIG. 2. The processor 220 performs step S104 in the embodiment shown in FIG. 2. For more details when the transceiver 210 and the processor 220 perform the foregoing steps, refer to related descriptions in the embodiment shown in FIG. 2. Details are not described herein again.

In this embodiment of the present invention, data is prevented from being simultaneously sent on two resources located in a same subframe. Therefore, a peak-to-average ratio is lower than that in prior approaches, and transmission power efficiency and coverage performance are higher than those in prior approaches.

For other functions of the processor 220 and the transceiver 210, refer to descriptions of the corresponding embodiments in the foregoing control information transmission methods. Details are not described herein again.

In addition, in another embodiment, the transceiver 210 is configured to receive a sequence sent by a terminal device; and the processor 220 is configured to determine, based on a preset mapping relationship between bit combinations and sequences, a bit combination corresponding to the received sequence, where in the mapping relationship, the bit combination includes a scheduling request SR bit and an acknowledgment ACK/negative acknowledgment NACK bit, and each bit combination corresponds to one sequence.

It can be learned from the foregoing embodiment that, the network side device 200 shown in FIG. 13 performs steps S203 and S204 in the embodiment shown in FIG. 11. Specifically, the transceiver 210 performs step S203 in the embodiment shown in FIG. 11. The processor 220 performs step S204 in the embodiment shown in FIG. 11. For more details when the transceiver 210 and the processor 220 perform the foregoing steps, refer to related descriptions in the embodiment shown in FIG. 11. Details are not described herein again.

Embodiments of the present invention further provides a data transmission system. The data transmission system includes the terminal device 100 and the network side device 200 described in the foregoing embodiments. For details, refer to the foregoing embodiments. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

To sum up, the foregoing descriptions are merely the embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A control information transmission method, comprising:
    when a first resource and a second resource that are configured by a network side device for a terminal device are located in a same subframe, receiving, on one of the first resource and the second resource, a modulation symbol sent by the terminal device; and
    determining, by the network side device based on the resource used to receive the modulation symbol and a preset mapping relationship between bit combinations and modulation symbols, a bit combination corresponding to the received modulation symbol, wherein in the preset mapping relationship, the bit combination comprises a scheduling request (SR) bit and an acknowledgment (ACK)/negative acknowledgment (NACK) bit, wherein each bit combination corresponds to one modulation symbol to be sent on the first resource or corresponds to one modulation symbol to be sent on the second resource, and wherein in bit combinations corresponding to modulation symbols sent on at least one of the first resource and the second resource, SR bits in at least two bit combinations are different, and ACK/NACK bits in at least two bit combinations are different, wherein,
    in the mapping relationship, each bit combination corresponds to one first-type modulation symbol and one second-type modulation symbol, and a value that is of one modulation symbol in the first-type modulation symbol and the second-type modulation symbol and that corresponds to a value of the bit combination is 0, and a value that is of the other modulation symbol and that corresponds to the value of the bit combination is not 0, and wherein the first-type modulation symbol is to be sent on the first resource, and the second-type modulation symbol is to be sent on the second resource, and wherein,
    the receiving, on one of the first resource and the second resource, a modulation symbol sent by the terminal device comprises: receiving, on the first resource, a first-type modulation symbol whose value is not 0 and is sent by the terminal device, or receiving, on the second resource, a second-type modulation symbol whose value is not 0 and is sent by the terminal device.

2. The method according to claim 1, wherein in the mapping relationship, a quantity of first-type modulation symbols whose values are not 0 is equal to a quantity of second-type modulation symbols whose values are not 0.

3. The method according to claim 1, wherein in the mapping relationship, the SR bit has M values, and the ACK/NACK bit has N values;
    there are M bit combinations corresponding to the first-type modulation symbol whose value is not 0, and values of SR bits in any two of the M bit combinations are different; and there are N bit combinations corresponding to the first-type modulation symbol whose value is not 0, and values of ACK/NACK bits in any two of the N bit combinations are different;
    there are M bit combinations corresponding to the second-type modulation symbol whose value is not 0, and values of SR bits in any two of the M bit combinations are different; and there are N bit combinations corresponding to the second-type modulation symbol whose value is not 0, and values of ACK/NACK bits in any two of the N bit combinations are different; and wherein M and N are each integers greater than or equal to 0.

4. The method according to claim 3, wherein in the mapping relationship, in bit combinations corresponding to each value of the SR bits, half of the bit combinations correspond to the first-type modulation symbol whose value is not 0, and the other half of the bit combinations correspond to the second-type modulation symbol whose value is not 0; and in bit combinations corresponding to each value of the ACK/NACK bits, half of the bit combinations correspond to the first-type modulation symbol whose value is not 0, and the other half of the bit combinations correspond to the second-type modulation symbol whose value is not 0.

5. A terminal device, comprising:
    a processor configured to: determine, based on a preset mapping relationship between bit combinations and modulation symbols, a modulation symbol corresponding to a to-be-transmitted bit combination and a resource used to send the determined modulation symbol, wherein in the preset mapping relationship, the bit combination comprises a scheduling request (SR) bit and an acknowledgment (ACK)/negative acknowledgment (NACK) bit, wherein each bit combination corresponds to one modulation symbol to be sent on a first resource or corresponds to one modulation symbol to be sent on a second resource, and wherein in bit combinations corresponding to modulation symbols sent on at least one of the first resource and the second resource, SR bits in at least two bit combinations are different, and ACK/NACK bits in at least two bit combinations are different; and
    a transceiver, communicatively coupled with the processor, configured to send, on the determined resource, the modulation symbol corresponding to the to-be-transmitted bit combination, wherein,
    in the mapping relationship, each bit combination corresponds to one first-type modulation symbol and one second-type modulation symbol, and a value that is of one modulation symbol in the first-type modulation symbol and the second-type modulation symbol and that corresponds to a value of the bit combination is 0, and a value that is of the other modulation symbol and that corresponds to the value of the bit combination is not 0, and wherein the first-type modulation symbol is to be sent on the first resource, and the second-type modulation symbol is to be sent on the second resource, and wherein,
    the transceiver is further configured to: send, on the first resource, a first-type modulation symbol that corresponds to the to-be-transmitted bit combination and whose value is not 0, or send, on the second resource, a second-type modulation symbol that corresponds to the to-be-transmitted bit combination and whose value is not 0.

6. The terminal device according to claim 5, wherein in the mapping relationship, a quantity of first-type modulation symbols whose values are not 0 is equal to a quantity of second-type modulation symbols whose values are not 0.

7. The terminal device according to claim 5, wherein in the mapping relationship, the SR bit has M values, and the ACK/NACK bit has N values;

there are M bit combinations corresponding to the first-type modulation symbol whose value is not 0, and values of SR bits in any two of the M bit combinations are different; and there are N bit combinations corresponding to the first-type modulation symbol whose value is not 0, and values of ACK/NACK bits in any two of the N bit combinations are different;

there are M bit combinations corresponding to the second-type modulation symbol whose value is not 0, and values of SR bits in any two of the M bit combinations are different; and there are N bit combinations corresponding to the second-type modulation symbol whose value is not 0, and values of ACK/NACK bits in any two of the N bit combinations are different; and wherein M and N are each integers greater than or equal to 0.

8. The terminal device according to claim 7, wherein in the mapping relationship, in bit combinations corresponding to each value of the SR bits, half of the bit combinations correspond to the first-type modulation symbol whose value is not 0, and the other half of the bit combinations correspond to the second-type modulation symbol whose value is not 0; and in bit combinations corresponding to each value of the ACK/NACK bits, half of the bit combinations correspond to the first-type modulation symbol whose value is not 0, and the other half of the bit combinations correspond to the second-type modulation symbol whose value is not 0.

9. A network side device, comprising:

a transceiver configured to receive, on one of a first resource and a second resource, a modulation symbol sent by the terminal device when the first resource and the second resource that are configured by a processor for a terminal device are located in a same subframe; and the processor, communicatively coupled with the transceiver, configured to determine, based on the resource used to receive the modulation symbol and a preset mapping relationship between bit combinations and modulation symbols, a bit combination corresponding to the received modulation symbol, wherein in the present mapping relationship, the bit combination comprises a scheduling request (SR) bit and an acknowledgment (ACK)/negative acknowledgment (NACK) bit, wherein each bit combination corresponds to one modulation symbol to be sent on the first resource or corresponds to one modulation symbol to be sent on the second resource, and wherein in bit combinations corresponding to modulation symbols sent on at least one of the first resource and the second resource, SR bits in at least two bit combinations are different, and ACK/NACK bits in at least two bit combinations are different, wherein, in the mapping relationship, each bit combination corresponds to one first-type modulation symbol and one second-type modulation symbol, and a value that is of one modulation symbol in the first-type modulation symbol and the second-type modulation symbol and that corresponds to a value of the bit combination is 0, and a value that is of the other modulation symbol and that corresponds to the value of the bit combination is not 0, and wherein the first-type modulation symbol is to be sent on the first resource, and the second-type modulation symbol is to be sent on the second resource, and wherein, the transceiver is specifically configured to: receive, on the first resource, a first-type modulation symbol whose value is not 0 and is sent by the terminal device, or receive, on the second resource, a second-type modulation symbol whose value is not 0 and is sent by the terminal device.

10. The network side device according to claim 9, wherein in the mapping relationship, a quantity of first-type modulation symbols whose values are not 0 is equal to a quantity of second-type modulation symbols whose values are not 0.

11. The network side device according to claim 9, wherein in the mapping relationship, the SR bit has M values, and the ACK/NACK bit has N values;

there are M bit combinations corresponding to the first-type modulation symbol whose value is not 0, and values of SR bits in any two of the M bit combinations are different; and there are N bit combinations corresponding to the first-type modulation symbol whose value is not 0, and values of ACK/NACK bits in any two of the N bit combinations are different;

there are M bit combinations corresponding to the second-type modulation symbol whose value is not 0, and values of SR bits in any two of the M bit combinations are different; and there are N bit combinations corresponding to the second-type modulation symbol whose value is not 0, and values of ACK/NACK bits in any two of the N bit combinations are different; and wherein M and N are each integers greater than or equal to 0.

12. The network side device according to claim 11, wherein in the mapping relationship, in bit combinations corresponding to each value of the SR bits, half of the bit combinations correspond to the first-type modulation symbol whose value is not 0, and the other half of the bit combinations correspond to the second-type modulation symbol whose value is not 0; and in bit combinations corresponding to each value of the ACK/NACK bits, half of the bit combinations correspond to the first-type modulation symbol whose value is not 0, and the other half of the bit combinations correspond to the second-type modulation symbol whose value is not 0.

* * * * *